United States Patent
Ono et al.

(10) Patent No.: US 10,468,651 B2
(45) Date of Patent: Nov. 5, 2019

(54) NON-AQUEOUS ELECTROLYTE SECONDARY BATTERY

(71) Applicant: Envision AESC Japan Ltd., Zama-shi, Kanagawa (JP)

(72) Inventors: Masato Ono, Kanagawa (JP); Ikuma Matsuzaki, Kanagawa (JP); Keisuke Matsumoto, Kanagawa (JP)

(73) Assignee: Envision AESC Japan Ltd., Zama-shi, Kanagawa (JP)

(*) Notice: Subject to any disclaimer, the term of this patent is extended or adjusted under 35 U.S.C. 154(b) by 0 days.

(21) Appl. No.: 16/324,049

(22) PCT Filed: Aug. 10, 2016

(86) PCT No.: PCT/JP2016/073658
§ 371 (c)(1),
(2) Date: Feb. 7, 2019

(87) PCT Pub. No.: WO2018/029832
PCT Pub. Date: Feb. 15, 2018

(65) Prior Publication Data
US 2019/0173070 A1 Jun. 6, 2019

(51) Int. Cl.
*H01M 2/16* (2006.01)
*H01M 4/13* (2010.01)
(Continued)

(52) U.S. Cl.
CPC ........... *H01M 2/1653* (2013.01); *H01M 2/02* (2013.01); *H01M 2/0207* (2013.01);
(Continued)

(58) Field of Classification Search
CPC ........... H01M 10/052; H01M 10/0525; H01M 10/0563; H01M 2220/20; H01M 2/02;
(Continued)

(56) References Cited

U.S. PATENT DOCUMENTS

2008/0166637 A1* 7/2008 Inagaki ............... H01M 4/366
429/329
2012/0270093 A1* 10/2012 Isozaki ............... H01M 4/131
429/156
(Continued)

FOREIGN PATENT DOCUMENTS

EP 3056336 A1 8/2016
JP H6203820 A 7/1994
(Continued)

OTHER PUBLICATIONS

Office Action from corresponding application KR 10-2019-7003231 dated Jul. 10, 2019; 5 pages.
(Continued)

*Primary Examiner* — Basia A Ridley
*Assistant Examiner* — Heng M. Chan
(74) *Attorney, Agent, or Firm* — Young Basile Hanlon & MacFarlane, P.C.

(57) ABSTRACT

A non-aqueous electrolyte secondary battery has improved battery cycle durability and suppresses internal short-circuits.
The non-aqueous electrolyte secondary battery includes a power generating element having a positive electrode, a negative electrode, and a separator including a resin film having a three-layer structure, a ratio of a rated capacity to a pore volume of a positive electrode active material layer being 2.08 Ah/cc or more, a ratio of a battery area to a rated capacity being 7 cm$^2$/Ah or more, and a rated capacity being 50 Ah or more, in which a value R represented by Formula 1 is 62 to 110:

$$R = \frac{\text{Tortuosity factor} \times \text{Thickness [µm]}}{\text{Porosity}} \quad \text{(Formula 1)}$$

provided that, the average pore diameter is 0.10 to 0.18 µm, the porosity is 0.43 to 0.65, the air permeability is 140 to 305 sec/100 ml, and the thickness is 11 to 25 µm.

7 Claims, 2 Drawing Sheets

(51) Int. Cl.
    *H01M 2/02* (2006.01)
    *H01M 2/18* (2006.01)
    *H01M 4/131* (2010.01)
    *H01M 4/133* (2010.01)
    *H01M 10/0525* (2010.01)
    *H01M 10/0563* (2010.01)
    *H01M 10/052* (2010.01)
    *H01M 10/056* (2010.01)

(52) U.S. Cl.
    CPC ....... *H01M 2/0267* (2013.01); *H01M 2/0285* (2013.01); *H01M 2/16* (2013.01); *H01M 2/1646* (2013.01); *H01M 2/1686* (2013.01); *H01M 2/18* (2013.01); *H01M 4/13* (2013.01); *H01M 4/131* (2013.01); *H01M 4/133* (2013.01); *H01M 10/0525* (2013.01); *H01M 10/0563* (2013.01); *H01M 10/052* (2013.01); *H01M 10/056* (2013.01); *H01M 2220/20* (2013.01)

(58) Field of Classification Search
    CPC ........ H01M 2/16; H01M 2/1653; H01M 2/18; H01M 4/13; H01M 4/131; H01M 4/133; H01M 10/056; H01M 2/0207; H01M 2/0267; H01M 2/0285; H01M 2/1646; H01M 2/1686
    See application file for complete search history.

(56) References Cited

U.S. PATENT DOCUMENTS

| | | |
|---|---|---|
| 2015/0050545 A1 | 2/2015 | Murata et al. |
| 2016/0013461 A1 | 1/2016 | Mizuno et al. |
| 2016/0028073 A1* | 1/2016 | Ohara ................... H01M 4/131 429/162 |
| 2016/0036044 A1* | 2/2016 | Ohara ................... H01M 4/131 429/223 |
| 2016/0056470 A1 | 2/2016 | Yamaguchi et al. |

FOREIGN PATENT DOCUMENTS

| | | | |
|---|---|---|---|
| JP | 2010147030 A | 7/2010 | |
| JP | 2012174433 A | 9/2012 | |
| JP | 5845381 B1 | 1/2016 | |
| KR | 20140131544 A | 11/2014 | |
| WO | 2007116672 A1 | 10/2007 | |
| WO | WO-2014142283 A1 * | 9/2014 | ............ H01M 4/131 |
| WO | WO-2014142284 A1 * | 9/2014 | ............ H01M 4/131 |
| WO | 2014157415 A1 | 10/2014 | |

OTHER PUBLICATIONS

Office Action from corresponding application KR 10-2019-7003231 dated Jul. 10, 2019; 5 pages; English Translation.

* cited by examiner

NON-AQUEOUS ELECTROLYTE SECONDARY BATTERY

TECHNICAL FIELD

The present invention relates to a non-aqueous electrolyte secondary battery.

BACKGROUND

Currently, a non-aqueous electrolyte secondary battery including a lithium ion secondary battery that is utilized for a mobile device such as a mobile phone is available as a commercial product. The non-aqueous electrolyte secondary battery generally has a configuration in which a positive electrode having a positive electrode active material or the like applied to a current collector and a negative electrode having a negative electrode active material or the like applied to a current collector are connected to each other via an electrolyte layer in which a non-aqueous electrolyte solution or a non-aqueous electrolyte gel is held in a separator. Further, charge and discharge reactions of a battery occur as ions such as lithium ions are absorbed into and desorbed from an electrode active material.

Incidentally, in recent years, it has been desired to reduce the amount of carbon dioxide in order to cope with global warming. Hence, a non-aqueous electrolyte secondary battery having a small environmental burden has been used not only in a mobile device or the like but also in a power source device of an electrically driven vehicle such as a hybrid vehicle (HEV), an electric vehicle (EV), or a fuel cell vehicle.

A non-aqueous electrolyte secondary battery directed to the application to electrically driven vehicles is desired to have a high output and a high capacity. According to this, an amount of chemical energy to be stored in the battery increases, so that safety securement becomes more important. Further, the non-aqueous electrolyte secondary battery directed to the application to electrically driven vehicles is desired to have cycle characteristics that the capacity can be maintained even when the charge and discharge cycle is repeated for a long period of time.

Herein, in the related art, there have also been a large number of proposals of a separator used in a non-aqueous electrolyte secondary battery such as a lithium ion secondary battery. For example, WO 2007/116672 A discloses a polyolefin microporous film including: a laminate having three or more layers including two surface layers and at least one intermediate layer, in which a limiting viscosity [η] and a pore closing temperature of each of the surface layers and the intermediate layer are controlled to predetermined values, respectively. Based on the literature, with such a configuration, it is possible to obtain a polyolefin microporous film in which safety at the time of overheating is maintained and a mechanical strength is satisfactory as well.

SUMMARY

In a non-aqueous electrolyte secondary battery to be mounted in an electrically driven vehicle, a higher capacity is demanded in order to lengthen a cruising distance per one charge. Here, according to studies of the present inventors, the present inventors have found that, when a conventionally known separator including a resin film having a three-layer structure is simply applied to a non-aqueous electrolyte secondary battery having a capacity and a size which are assumed to increase the capacity, sufficient cycle durability is not obtainable or occurrence of internal short-circuit in a power generating element when the battery is damaged from the outside cannot be sufficiently suppressed in some cases.

In this regard, an object of the present invention is to provide a means capable of improving battery cycle durability in a non-aqueous electrolyte secondary battery having a capacity and a size which are assumed to increase the capacity and capable of suppressing occurrence of internal short-circuit in a power generating element when the battery is damaged from the outside.

The present inventors have conducted intensive studies in order to solve the above-described problems. As a result, the present inventors have found that the above-described problems can be solved by a separator in which a value R calculated from a tortuosity factor, a thickness, and a porosity of the separator is in a predetermined range being applied to a non-aqueous electrolyte secondary battery having a capacity and a size which are assumed to increase the capacity, thereby completing the present invention.

That is, a non-aqueous electrolyte secondary battery according to an embodiment of the present invention includes a power generating element including a positive electrode obtained by forming a positive electrode active material layer containing a positive electrode active material on a surface of a positive electrode current collector, a negative electrode obtained by forming a negative electrode active material layer containing a negative electrode active material on a surface of a negative electrode current collector, and a separator including a resin film having a three-layer structure. Further, the non-aqueous electrolyte secondary battery has a ratio of a rated capacity to a pore volume of the positive electrode active material layer of 2.08 Ah/cc or more, a ratio of a battery area to a rated capacity of 7 $cm^2$/Ah or more, and a rated capacity of 50 Ah or more. Further, a value R of the separator represented by the following Formula 1:

$$R = \frac{\text{Tortuosity factor} \times \text{Thickness [μm]}}{\text{Porosity}} \quad \text{(Formula 1)}$$

is 62 to 110, (provided that, in Formula 1, the tortuosity factor is a value represented by the following Formula 2:

$$\text{Tortuosity factor} = \sqrt{\frac{\text{Air permeability [sec/100 ml]} \times \text{Average pore diameter [μm]} \times \text{Porosity}}{\text{Thickness [μm]} \times 25 \times 5.18 \times 10^{-3}}} \quad \text{(Formula 2)}$$

the average pore diameter is 0.10 to 0.18 μm, the porosity is 0.43 to 0.65, the air permeability is 140 to 305 sec/100 ml, and the thickness is 11 to 25 μm).

DETAILED DESCRIPTION

Figure 1:
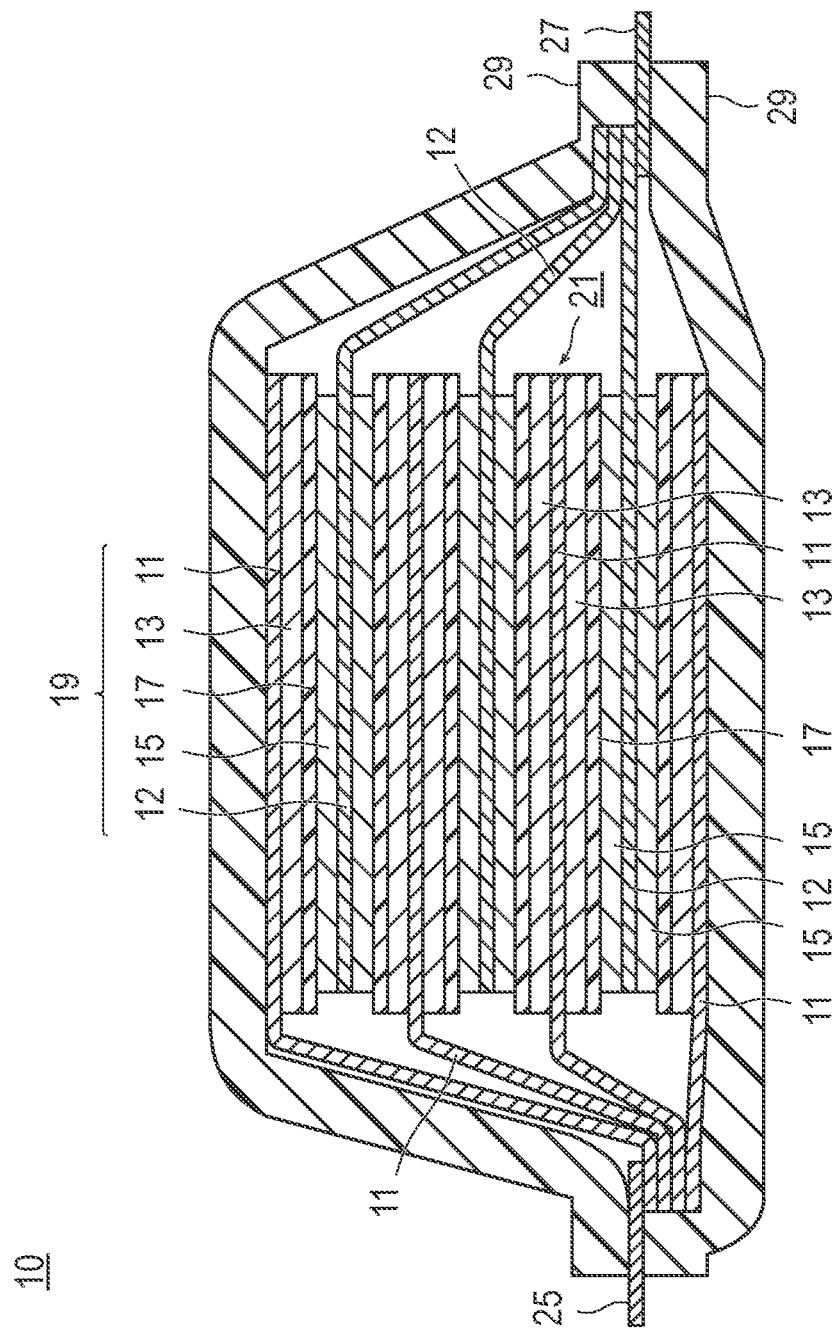
FIG. 1 is a schematic cross-sectional view illustrating a basic configuration of a flat type (laminate type) non-aqueous electrolyte lithium ion secondary battery, which is not a bipolar type, as an embodiment of a non-aqueous electrolyte secondary battery.

A non-aqueous electrolyte secondary battery according to an embodiment of the present invention includes a power generating element including a positive electrode obtained by forming a positive electrode active material layer containing a positive electrode active material on a surface of a positive electrode current collector, a negative electrode obtained by forming a negative electrode active material layer containing a negative electrode active material on a surface of a negative electrode current collector, and a separator including a resin film having a three-layer structure. Further, the non-aqueous electrolyte secondary battery has a ratio of a rated capacity to a pore volume of the positive electrode active material layer of 2.08 Ah/cc or more, a ratio of a battery area to a rated capacity of 7 cm²/Ah or more, and a rated capacity of 50 Ah or more. Further, a value R of the separator represented by the following Formula 1:

$$R = \frac{\text{Tortuosity factor} \times \text{Thickness [μm]}}{\text{Porosity}} \quad \text{(Formula 1)}$$

is 62 to 110, (provided that, in Formula 1, the tortuosity factor is a value represented by the following Formula 2:

$$\text{Tortuosity factor} = \sqrt{\frac{\text{Air permeability [sec/100 ml]} \times \text{Average pore diameter [μm]} \times \text{Porosity}}{\text{Thickness [μm]} \times 25 \times 5.18 \times 10^{-3}}} \quad \text{(Formula 2)}$$

the average pore diameter is 0.10 to 0.18 μm, the porosity is 0.43 to 0.65, the air permeability is 140 to 305 sec/100 ml, and the thickness is 11 to 25 μm).

So far, in an electrically driven vehicle, as compared to the case of one fueling in a gasoline vehicle, a distance that the electrically driven vehicle can travel per one charge (cruising distance) is short, and thus for wide use of the electrically driven vehicle, it is desired to extend the cruising distance of the electrically driven vehicle. In order to achieve a long cruising distance, it is necessary to increase a capacity of a battery to be mounted in the electrically driven vehicle. Further, as a means for achieving an increase in capacity of the battery, there is mentioned a means for increasing an area (size) of the battery, increasing a capacity of an active material contained in the active material layer, increasing a density of the active material in the active material layer, increasing a thickness of the active material layer, or the like.

The present inventors have conducted studies on a non-aqueous electrolyte secondary battery in which a ratio of a rated capacity to a pore volume of a positive electrode active material layer is 2.08 Ah/cc or more, a ratio of a battery area to a rated capacity is 7 cm²/Ah or more, and a rated capacity is 50 Ah or more, as a non-aqueous electrolyte secondary battery having a capacity and a size which are assumed to increase the capacity (hereinafter, also simply referred to as "high-capacity battery"). In the course of the studies, the present inventors have found that, in a case where a conventionally known separator including a resin film having a three-layer structure is simply applied to such a high-capacity battery, sufficient cycle durability and a sufficient mechanical strength are not obtainable in some cases. In this regard, the present inventors have found that, by applying, to a high-capacity battery, a separator in which a value R obtained from a tortuosity factor, a thickness, and a porosity of the separator is in a predetermined range, a mechanical strength sufficient to secure high cycle durability and battery safety can be realized, thereby completing the present invention.

The detailed mechanisms for the effect being exhibited are not clear but are speculated as follows. Incidentally, the technical scope of the present invention is not limited to the following mechanisms.

In general, since a conventionally known separator including a resin film having a three-layer structure is excellent in mechanical strength as compared to a separator having a single-layer structure, the separator including a resin film having a three-layer structure is extremely effective in view of safety that occurrence of internal short-circuit in a power generating element when the battery is damaged from the outside is suppressed. Meanwhile, the resin film having a three-layer structure has a feature that ion conductivity of lithium ions or the like is low. It is considered that this feature is caused by continuity of pores on a bonded surface between layers being degraded or the shape of pores being complicated.

In the high-capacity battery, the active material layer may be designed to be thick as compared to general-use non-aqueous electrolyte secondary batteries for use in mobile phones, notebook computers, and the like. When the active material layer is increased in thickness in this way, charge and discharge reactions may proceed ununiformly with respect to a thickness direction of the electrode. That is, in the initial stage of discharging after fully charging, parts on the surface side of the negative electrode and the positive electrode, which are adjacent to each other via the separator (parts spaced away from the current collector), preferentially react. In the terminal stage of discharging thereafter, parts, which are close to the current collector, of the negative electrode and the positive electrode react. At this time, since a distance between the negative electrode active material at the part, which is close to the current collector, of the negative electrode and the positive electrode active material at the part, which is close to the current collector, of the positive electrode is long, if ion conductivity is not sufficient, a part at which the discharge reaction hardly proceeds is generated, and depending on the circumstances, next charging may be performed without the discharge reaction being performed at that part. If charging and discharging are repeated in a state where discharging is not sufficiently performed, charge and discharge reactions are repeated preferentially at a surface part of the electrode on the separator. Thus, various problems may arise in that (i) a SEI coating film on the surface of the negative electrode active material is increased in thickness at the surface part of the negative electrode; (ii) the resistance of the negative electrode active material at the surface part of the negative electrode is increased by the thick coating film so that over discharging locally occurs at the time of discharging at a part at which the thickness of the coating film is thin, and thus the coating film is oxidatively decomposed; (iii) the electrolyte solution is reductively decomposed at the time of charging at a part at which the coating film is oxidatively decomposed; and the like. These problems all cause a degradation in cycle durability of the battery.

In this regard, by applying a separator in which the value R obtained from the tortuosity factor, the thickness, and the porosity of the separator is in a predetermined range, it is possible to improve ion conductivity while a sufficient mechanical strength is maintained. According to this, charge and discharge reactions proceed more uniformly in the thickness direction of the electrode, and occurrence of various problems such as local degradation of the electrode and decomposition of the electrolyte solution may be suppressed. As a result, also in the non-aqueous electrolyte secondary battery having a capacity and a size which are assumed to increase the capacity, it is considered that occurrence of internal short-circuit can be sufficiently suppressed and high cycle durability can be exhibited.

Hereinafter, embodiments of the present invention will be described with reference to the accompanying drawings. Incidentally, the same elements are given with the same symbols for the descriptions of the drawings, and overlapped descriptions are omitted. Further, dimensional ratios in the drawings are exaggerated for the sake of description and are different from actual ratios in some cases.

Further, in the present specification, "X to Y" indicating a range means "X or more and Y or less." Also, unless otherwise specified, operations and measurement of physical properties and the like are performed under the conditions of room temperature (20 to 25° C.)/relative humidity of 40 to 50%.

[Non-Aqueous Electrolyte Secondary Battery]

FIG. 1 is a schematic cross-sectional view schematically illustrating the overview of a laminate type battery as an embodiment of a battery of the present invention. Incidentally, in the present specification, detailed description will be given using a lithium ion secondary battery, which is a flat type (laminate type) but not a bipolar type, illustrated in FIG. 1 as an example, but the technical scope of the present invention is not limited only to such an embodiment.

First, the overall structure of the non-aqueous electrolyte secondary battery of the present invention will be described using the drawings.

[Overall Structure of Battery]

FIG. 1 is a schematic cross-sectional view schematically illustrating the basic configuration of a flat type (laminate type) non-aqueous electrolyte lithium ion secondary battery which is not a bipolar type (hereinafter, also simply referred to as a "laminate type battery"). As illustrated in FIG. 1, a laminate type battery 10 of this embodiment has a structure in which a power generating element 21 with a substantially rectangular shape, in which charge and discharge reactions actually proceed, is sealed in a battery outer casing body 29 as an outer casing body. Herein, the power generating element 21 has a configuration in which a positive electrode, a separator 17, and a negative electrode are laminated. Incidentally, the separator 17 includes a laminate of a three-layer laminate resin film (not illustrated) having a configuration of a polypropylene (PP) porous film/a polyethylene (PE) porous film/a polypropylene (PP) porous film and a ceramic layer (heat resistant insulating layer) (not illustrated) having inorganic particles such as alumina dispersed in a binder formed of a resin, and has a non-aqueous electrolyte (for example, liquid electrolyte) therein. The positive electrode has a structure in which a positive electrode active material layer 15 is disposed on both surfaces of a positive electrode current collector 12. The negative electrode has a structure in which a negative electrode active material layer 13 is disposed on both surfaces of a negative electrode current collector 11. Specifically, the negative electrode, the electrolyte layer, and the positive electrode are laminated in this order such that one positive electrode active material layer 15 and the negative electrode active material layer 13 adjacent thereto face each other via the separator 17. According to this, the adjacent positive electrode, electrolyte layer, and negative electrode constitute one single battery layer 19. Therefore, it can also be said that the laminate type battery 10 illustrated in FIG. 1 has a configuration in which a plurality of the single battery layers 19 are laminated to be electrically connected in parallel.

Incidentally, the negative electrode active material layer 13 is disposed only on one surface of both the outermost layer negative electrode current collectors positioned on both outermost layers of the power generating element 21. However, an active material layer may be formed on both surfaces thereof. That is, not a current collector exclusive for an outermost layer in which an active material layer is formed on only one surface is used but a current collector having an active material layer on both surfaces may be directly used as the current collector of the outermost layer. Further, a positive electrode active material layer may be disposed on one surface of the outermost layer positive electrode current collector by reversing the disposition of the positive electrode and negative electrode in FIG. 1 so that the outermost layer positive electrode current collector is disposed on both the outermost layers of the power generating element 21.

The positive electrode current collector 12 and the negative electrode current collector 11 has a structure in which a positive electrode current collecting plate (tab) 27 and a negative electrode current collecting plate (tab) 25, which conductively communicate with each electrode (positive electrode and negative electrode), are attached to them respectively and led to the outside of the battery outer casing body 29 so as to be inserted between the end parts of the battery outer casing body 29. If necessary, each of the positive electrode current collecting plate 27 and the negative electrode current collecting plate 25 may be attached to the positive electrode current collector 12 and the negative electrode current collector 11 of each electrode via a positive electrode lead and a negative electrode lead (not illustrated) by ultrasonic welding, resistance welding, or the like.

Incidentally, although a laminate type battery, which is a flat type (laminate type) but not a bipolar type, is illustrated in FIG. 1, it may be a bipolar type battery including a bipolar type electrode which has a positive electrode active material layer electrically bound to one surface of a current collector and a negative electrode active material layer electrically bound to the opposite surface of the current collector. In this case, one current collector plays roles of both the positive electrode current collector and the negative electrode current collector.

Hereinafter, respective members constituting the non-aqueous electrolyte lithium ion secondary battery according to an embodiment of the present invention will be described.

[Positive Electrode]

The positive electrode includes a positive electrode current collector and a positive electrode active material layer containing a positive electrode active material formed on the surface of the positive electrode current collector.

(Positive Electrode Current Collector)

The material constituting the positive electrode current collector is not particularly limited, but a metal is suitably used. Specific examples of the metal include aluminum, nickel, iron, stainless steel, titanium, copper, an alloy, and the like. In addition to these, a clad material of nickel and aluminum, a clad material of copper and aluminum, a plating material of a combination of these metals, or the like can be preferably used. Further, the material may be a foil obtained by coating aluminum on a metal surface. Among them, from the viewpoint of the electron conductivity and the potential for operating the battery, aluminum, stainless steel, and copper are preferable.

The size of the current collector is determined depending on the use of application of the battery. A current collector having a large area is used, for example, when the current collector is used in a large-sized battery which requires a high energy density. The thickness of the current collector is not particularly limited as well. The thickness of the current collector is generally about 1 to 100 μm.

Further, in the negative electrode described later, also in the case of using the negative electrode current collector, the same materials as described above can be used.

(Positive Electrode Active Material Layer)

The positive electrode active material layer 15 contains a positive electrode active material, and if necessary, further contains other additives such as a conductive aid, a binder, an electrolyte salt (lithium salt) as an electrolyte, and an ion conductive polymer.

(Positive Electrode Active Material)

Examples of the positive electrode active material include lithium-transition metal composite oxides such as $LiMn_2O_4$, $LiCoO_2$, $LiNiO_2$, $Li(Ni—Mn—Co)O_2$, and those in which a part of these transition metals are substituted with other elements, lithium-transition metal phosphate compounds, and lithium-transition metal sulfate compounds. Depending on the cases, two or more kinds of positive electrode active materials may be used concurrently. A lithium-transition metal composite oxide is preferably used as the positive electrode active material from the viewpoint of capacity and output characteristics. Depending on the cases, two or more kinds of positive electrode active materials may be used concurrently.

$Li(Ni—Mn—Co)O_2$ and those in which a part of these transition metals are substituted with other elements (hereinafter, also simply referred to as the "NMC composite oxide") are more preferably used. The NMC composite oxide has a layered crystal structure in which a lithium atom layer and a transition metal (Mn, Ni, and Co are orderly disposed) atom layer are alternately laminated via an oxygen atom layer, one Li atom is contained per one atom of the transition metal, the amount of Li that can be taken out is twofold that of spinel type lithium manganese oxide, that is, the supply ability is twofold, and the NMC composite oxide can thus have a high capacity.

As described above, the NMC composite oxide also includes a composite oxide in which a part of the transition metal elements is substituted with other metal elements. Examples of the other elements in that case include Ti, Zr, Nb, W, P, Al, Mg, V, Ca, Sr, Cr, Fe, B, Ga, In, Si, Mo, Y, Sn, V, Cu, Ag, Zn, and the like. The other elements are preferably Ti, Zr, Nb, W, P, Al, Mg, V, Ca, Sr, and Cr, the other elements are more preferably Ti, Zr, P, Al, Mg, and Cr, and from the viewpoint of improving the cycle characteristics, the other elements are further preferably Ti, Zr, Al, Mg, and Cr.

The NMC composite oxide preferably has a composition represented by General Formula (1): $Li_aNi_bMn_cCo_dM_xO_2$ (provided that, in the formula, a, b, c, d, and x satisfy $0.9 \leq a \leq 1.2$, $0 < b < 1$, $0 < c \leq 0.5$, $0 < d \leq 0.5$, $0 \leq x \leq 0.3$, and $b+c+d=1$; and M is at least one element selected from Ti, Zr, Nb, W, P, Al, Mg, V, Ca, Sr, and Cr) since the theoretical discharge capacity is high. Herein, a represents the atomic ratio of Li, b represents the atomic ratio of Ni, c represents the atomic ratio of Mn, d represents the atomic ratio of Co, and x represents the atomic ratio of M. From the viewpoint of cycle characteristics, it is preferable that $0.4 \leq b \leq 0.6$ in General Formula (1) is satisfied. Incidentally, the composition of the respective elements can be measured by, for example, inductively coupled plasma (ICP) emission spectrometry.

In general, it is known that nickel (Ni), cobalt (Co), and manganese (Mn) contribute to the capacity and output characteristics from the viewpoint of improving purity of the material and improving electron conductivity. Ti or the like partially substitutes the transition metal in the crystal lattice. From the viewpoint of cycle characteristics, a part of the transition element may be substituted with another metal element. In this case, it is preferable that $0 < x \leq 0.3$ in General Formula (1) is satisfied. It is considered that the crystal structure is stabilized by a solid solution formed by at least one kind selected from the group consisting of Ti, Zr, Nb, W, P, Al, Mg, V, Ca, Sr, and Cr, and as a result, a decrease in capacity of the battery can be prevented even when charge and discharge are repeated and excellent cycle characteristics can be realized.

As a more preferable embodiment, it is preferable that $0.44 \leq b \leq 0.51$, $0.27 \leq c \leq 0.31$, and $0.19 \leq d \leq 0.26$ in General Formula (1) are satisfied, in view of achieving an excellent balance between the capacity and durability.

The NMC composite oxide can be produced by selecting various known methods such as a co-precipitation method and a spray drying method. It is preferable to use a co-precipitation method since the production of the composite oxide is easy. Specifically, for example, as the method described in JP 2011-105588 A, a nickel-cobalt-manganese composite hydroxide is produced by a co-precipitation method. Thereafter, the nickel-cobalt-manganese composite hydroxide is mixed with a lithium compound, and the mixture is calcined so that the NMC composite oxide can be obtained.

Incidentally, it is needless to say that a positive electrode active material other than those described above may be used.

The average particle diameter of the positive electrode active material contained in the positive electrode active material layer is not particularly limited, but is preferably 1 to 100 μm and more preferably 1 to 25 μm from the viewpoint of increasing the output.

The content of the positive electrode active material in the positive electrode active material layer is preferably 80 to 99.5% by mass and more preferably 85 to 99.5% by mass.

(Binder)

The binder used in the positive electrode active material layer is not particularly limited, and for example, the following materials are exemplified. Examples thereof include thermoplastic polymers such as polyethylene, polypropylene, polyethylene terephthalate (PET), polyether nitrile, polyacrylonitrile, polyimide, polyamide, cellulose, carboxymethyl cellulose (CMC) and a salt thereof, an ethylene-vinyl acetate copolymer, polyvinyl chloride, styrene-butadiene rubber (SBR), isoprene rubber, butadiene rubber, ethylene-propylene rubber, an ethylene-propylene-diene copolymer, a styrene-butadiene-styrene block copolymer and a hydrogenated product thereof, and a styrene-isoprene-styrene block copolymer and a hydrogenated product thereof; fluorine resins such as polyvinylidene fluoride (PVdF), polytetrafluoroethylene (PTFE), a tetrafluoroethylene-hexafluoropropylene copolymer (FEP), a tetrafluoroethylene-perfluoroalkylvinylether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF); vinylidene fluoride-based fluorine rubber such as vinylidene fluoride-hexafluoropropylene-based fluorine rubber (VDF-HFP-based fluorine rubber), vinylidene fluoride-hexafluoropropylene-tetrafluoroethylene-based fluorine rubber (VDF-HFP-TFE-based fluorine rubber), vinylidene fluoride-pentafluoropropylene-based fluorine rubber (VDF-PFP-based fluorine rubber), vinylidene fluoride-pentafluoropropylene-tetrafluoroethylene-based fluorine rubber (VDF-PFP-TFE-based fluorine rubber), vinylidene fluoride-perfluoromethyl vinyl ether-tetrafluoroethylene-based fluorine rubber (VDF-PFMVE-TFE-based fluorine rubber), and vinylidene fluoride-chlorotrifluoroethylene-based fluorine rubber (VDF-CTFE-based fluorine rubber); and an epoxy resin. These binders may be used singly or two or more kinds thereof may be used concurrently.

The amount of the binder contained in the positive electrode active material layer is not particularly limited as long as it is such an amount that the active material can be bound, but the amount of the binder is preferably 0.5 to 15% by mass and more preferably 1 to 10% by mass with respect to the active material layer.

The positive electrode active material layer further contains, if necessary, other additives such as a conductive aid, an electrolyte (a polymer matrix, an ion conductive polymer, an electrolyte solution, and the like), and a lithium salt for enhancing ion conductivity.

The conductive aid refers to an additive that is blended in order to improve the conductivity of the positive electrode active material layer or the negative electrode active material layer. Examples of the conductive aid include carbon materials such as carbon black including ketjen black, acetylene black, and the like, and a carbon fiber. When the active material layer contains the conductive aid, the electron network in the inside of the active material layer is effectively formed, thereby contributing to the improvement of output characteristics of the battery.

Examples of the electrolyte salt (lithium salt) include $Li(C_2F_5SO_2)_2N$, $LiPF_6$, $LiBF_4$, $LiClO_4$, $LiAsF_6$, $LiCF_3SO_3$, and the like.

Examples of the ion conductive polymer include a polyethylene oxide (PEO)-based polymer and a polypropylene oxide (PPO)-based polymer.

The blending ratio of the components that are contained in the positive electrode active material layer and the negative electrode active material layer described later is not particularly limited. The blending ratio can be adjusted by appropriately referring to the known knowledge on a lithium ion secondary battery. The thickness of each active material layer is not particularly limited as well, and the known knowledge on a battery can be appropriately referred to. As an example, the thickness of each active material layer is about 2 to 1500 μm. In particular, as for a non-aqueous electrolyte secondary battery having a capacity and a size which are assumed to increase the capacity, in a case where a capacity is increased by increasing the thickness of each active material layer, the thickness of each active material layer is preferably 100 to 1500 μm, more preferably 120 to 1000 μm, further preferably 130 to 700 μm, and particularly preferably 140 to 500 μm.

[Negative Electrode]

The negative electrode includes a negative electrode current collector and a negative electrode active material layer formed on the surface of the negative electrode current collector.

(Negative Electrode Active Material Layer)

The negative electrode active material layer contains a negative electrode active material, and if necessary, further contains other additives such as a conductive aid, a binder, an electrolyte (a polymer matrix, an ion conductive polymer, an electrolyte solution, and the like), and a lithium salt for enhancing ion conductivity. The other additives such as a conductive aid, a binder, an electrolyte (a polymer matrix, an ion conductive polymer, an electrolyte solution, and the like), and a lithium salt for enhancing ion conductivity are the same as those described above in the section of the positive electrode active material layer.

Examples of the negative electrode active material include graphite such as artificial graphite, coated natural graphite, or natural graphite, a carbon material such as soft carbon or hard carbon, a lithium-transition metal composite oxide (for example, $Li_4Ti_5O_{12}$), a metal material, and a lithium alloy-based negative electrode material. Depending on the cases, two or more kinds of negative electrode active materials may be used concurrently. Preferably, a carbon material or a lithium-transition metal composite oxide is used as the negative electrode active material from the viewpoint of the capacity and output characteristics. Incidentally, it is needless to say that a negative electrode active material other than those described above may be used.

The average particle diameter of the negative electrode active material is not particularly limited but is preferably 1 to 100 μm and more preferably 1 to 30 μm from the viewpoint of increasing the output.

The negative electrode active material layer preferably contains at least an aqueous binder. The aqueous binder exhibits a high binding force. In addition, procurement of water as a raw material is easy and also only water vapor is generated during drying, and thus, there is an advantage that the investment on facilities of a production line can be greatly cut down and a decrease in environmental burden can be achieved.

The aqueous binder refers to a binder which has water as a solvent or a dispersion medium, and specific examples thereof include a thermoplastic resin, a polymer exhibiting rubber elasticity, a water-soluble polymer, a mixture thereof, and the like. Herein, the binder which contains water as a dispersion medium includes all which are regarded as latex or an emulsion and refers to a polymer that is emulsified in water or suspended in water. Examples thereof include a polymer latex obtained by emulsion polymerization in a self-emulsifying system.

Specific examples of the aqueous binder include a styrene polymer (styrene-butadiene rubber, a styrene-vinyl acetate copolymer, a styrene-acrylic copolymer, or the like), acrylonitrile-butadiene rubber, methyl methacrylate-butadiene rubber, a (meth)acrylic polymer (polyethyl acrylate, polyethyl methacrylate, polypropyl acrylate, polymethyl methacrylate (methyl methacrylate rubber), polypropyl methacrylate, polyisopropyl acrylate, polyisopropyl methacrylate, polybutyl acrylate, polybutyl methacrylate, polyhexyl acrylate, polyhexyl methacrylate, polyethylhexyl acrylate, polyethylhexyl methacrylate, polylauryl acrylate, polylauryl methacrylate, or the like), polytetrafluoroethylene, polyethylene, polypropylene, an ethylene-propylene copolymer, polybutadiene, butyl rubber, fluorine rubber, polyethylene oxide, polyepichlorohydrin, polyphosphagen, polyacrylonitrile, polystyrene, an ethylene-propylene-diene copolymer, polyvinylpyridine, chlorosulfonated polyethylene, a polyester resin, a phenolic resin, an epoxy resin; polyvinyl alcohol (the average polymerization degree is suitably 200 to 4000 and more suitably 1000 to 3000, and the saponification degree is suitably 80% by mol or more and more suitably 90% by mol or more) and a modified product thereof (a product obtained by saponifying 1 to 80% by mol of the vinyl acetate units in a copolymer of ethylene/vinyl acetate=2/98 to 30/70 (molar ratio), a product obtained by partially acetalizing polyvinyl alcohol at 1 to 50% by mol, or the like), starch and a modified product thereof (oxidized starch, phosphoric acid esterified starch, cationized starch, or the like), cellulose derivatives (carboxymethyl cellulose, methyl cellulose, hydroxypropyl cellulose, hydroxyethyl cellulose, a salt thereof, or the like), polyvinylpyrrolidone, polyacrylic acid (salt), polyethylene glycol, a copolymer of (meth)acrylamide and/or a (meth)acrylate salt [a (meth) acrylamide polymer, a (meth)acrylamide-(meth)acrylate salt copolymer, a (meth)acrylic acid alkyl (having 1 to 4 carbon atoms) ester-(meth)acrylate salt copolymer, or the like], a styrene-maleate salt copolymer, a mannich modified product of polyacrylamide, a formalin condensation type resin (a urea-formalin resin, a melamin-formalin resin, or the like), a polyamide polyamine or dialkylamine-epichlorohydrin copolymer, polyethyleneimine, casein, soybean protein, synthetic protein, a water-soluble polymer such as a galactomannan derivative, and the like. These aqueous binders may be used singly or two or more kinds thereof may be used concurrently.

From the viewpoint of binding property, the aqueous binder preferably contains at least one rubber-based binder selected from the group consisting of styrene-butadiene rubber, acrylonitrile-butadiene rubber, methyl methacrylate-butadiene rubber, and methyl methacrylate rubber. Further, the aqueous binder preferably contains styrene-butadiene rubber since the binding property thereof is favorable.

In the case of using styrene-butadiene rubber as the aqueous binder, it is preferable to concurrently use the above-described water-soluble polymer from the viewpoint of the improvement in coating property. Examples of the water-soluble polymer which is suitably concurrently used with styrene-butadiene rubber include polyvinyl alcohol and a modified product thereof, starch and a modified product thereof, cellulose derivatives (carboxymethyl cellulose, methyl cellulose, hydroxyethyl cellulose, a salt thereof, or the like), polyvinylpyrrolidone, polyacrylic acid (salt), and polyethylene glycol. Among them, styrene-butadiene rubber and carboxymethyl cellulose (salt) are preferably combined as a binder. The mass content ratio of the styrene-butadiene rubber to the water-soluble polymer is not particularly limited, but it is preferable that the ratio of the styrene-butadiene rubber:the water-soluble polymer is 1:0.1 to 10 and more preferably 1:0.5 to 2.

The content of the aqueous binder of the binder used in the negative electrode active material layer is preferably 80 to 100% by mass, preferably 90 to 100% by mass, and preferably 100% by mass.

[Separator]

The non-aqueous electrolyte secondary battery according to this embodiment has a feature in that the separator includes a resin film of a three-layer structure. Herein, the expression "the resin film has a three-layer structure" means that the resin film has a structure in which three layers of films formed of one resin material (including a form in which two or more kinds of polymer compounds are mixed) are laminated. Incidentally, the resin film may have a four-layer structure, a five-layer structure, or six- or more layer laminate structure as long as it has a three-layer structure. However, from the viewpoint of securing sufficient ion conductivity, the resin film preferably has a three- to five-layer structure, more preferably three- or four-layer structure, and further preferably three-layer structure.

The resin film may have any form as long as it can exhibit the functions of the separator (a function of passing ions and a function as a partition wall) in the non-aqueous electrolyte secondary battery. Specifically, examples of the resin film include a porous resin film, a woven film or a non-woven film configured by a fibrous resin, and the like, but among these, the resin film is preferably a porous resin film.

The constituent of the resin film is not particularly limiter, and examples thereof include polyolefin such as polyethylene (PE; high-density polyethylene (HDPE), low-density polyethylene (LDPE)), or polypropylene (PP); a hydrocarbon-based resin such as polyimide, aramid, or polyvinylidene fluoride-hexafluoropropylene (PVdF-HFP), and the like, but the constituent is not limited thereto. Of them, the constituent of the resin film is preferably a polyolefin film, more preferably at least one of polypropylene (PP) and polyethylene (PE), and further preferably PP and PE. In particular, in the non-aqueous electrolyte secondary battery according to this embodiment, it is preferable to use a separator including a resin film having a three-layer structure of PP/PE/PP.

The thickness of the resin film cannot be uniformly defined as it varies depending on use of application. However, for example, for an application such as an application in a secondary battery for operating a motor of an electric vehicle (EV), a hybrid electric vehicle (HEV), fuel cell vehicle (FCV), or the like, the whole thickness of the resin film (laminate) having a structure of three or more layers is preferably 11 to 25 µm and more preferably 7 to 18 µm. At this time, in a case where the resin film has a three-layer structure, the thickness of the center layer is preferably 3 to 9 µm and more preferably 3 to 6 µm. Further, the thickness of the surface layer (layer other than the center layer) is preferably 3 to 9 µm and more preferably 3 to 6 µm. Incidentally, in a case where the resin film is a porous resin film, the pore diameter (micropore diameter) of the porous resin film is preferably 1 µm or less at most (usually, a pore diameter of about several tens of nm).

In this embodiment, the separator may be configured by only the resin film having a three-layer structure described above or may be a separator having a laminate structure of the resin film and another layer. In particular, by employing a laminate structure of a resin film and a heat resistant insulating layer, the heat resistant insulating layer suppresses the thermal shrinkage of the resin film so that a separator with excellent heat resistance can be obtained.

The heat resistant insulating layer is typically a ceramic layer containing inorganic particles and a binder. By having such a heat resistant insulating layer formed of a ceramic layer, internal stress of the separator which increases when the temperature increases is alleviated so that the effect of suppressing thermal shrinkage can be obtained. Further, if the thermal shrinkage of the separator is suppressed, an occurrence of a short circuit between electrodes of the battery can be prevented so that a battery configuration in which the deterioration in performance due to an increase in temperature hardly occurs is obtained. Furthermore, by the separator having the heat resistant insulating layer, the mechanical strength of the separator is improved so that the membrane of the separator is hardly broken. Further, there is also an advantage that the separator is hardly curled during the producing process of the battery because of the effect of suppressing thermal shrinkage and a high mechanical strength.

The inorganic particles contained in the heat resistant insulating layer (ceramic layer) contribute to the mechanical strength or the effect of suppressing thermal shrinkage of the heat resistant insulating layer. The material used as the inorganic particles is not particularly limited, but examples thereof include oxides ($SiO_2$, $Al_2O_3$, $ZrO_2$, and $TiO_2$), hydroxides, and nitrides of silicon, aluminum, zirconium, and titanium, and a composite thereof. These inorganic particles may be those which are derived from mineral resources such as boehmite, zeolite, apatite, kaolin, mullite, spinel, olivine, and mica, or those which are artificially synthesized. Further, these inorganic particles may be used singly or two or more kinds thereof may be used concurrently. Among them, it is preferable to use silica ($SiO_2$) or alumina ($Al_2O_3$) and it is more preferable to use alumina ($Al_2O_3$) from the viewpoint of cost. The weight per unit area of the inorganic particles is not particularly limited but is preferably 5 to 15 $g/m^2$. It is preferable that the weight per unit area is within this range since sufficient ion conductivity is obtainable and the heat resistant strength is maintained.

The binder contained in the heat resistant insulating layer has a role to bond the inorganic particles to one another or the inorganic particles to the aforementioned resin film. The heat resistant insulating layer is stably formed by this binder and also peeling between the resin film and the heat resistant insulating layer is prevented.

The binder contained in the heat resistant insulating layer is not particularly limited, and for example, compounds such as carboxymethyl cellulose (CMC), polyacrylonitrile, cellulose, an ethylene-vinyl acetate copolymer, polyvinyl chloride, styrene-butadiene rubber (SBR), isoprene rubber, butadiene rubber, polyvinylidene fluoride (PVDF), polytetrafluoroethylene (PTFE), polyvinyl fluoride (PVF), and methyl acrylate can be used as the binder. Among these, carboxymethyl cellulose (CMC), methyl acrylate, or polyvinylidene fluoride (PVDF) is preferably used. These compounds may be used singly or two or more kinds thereof may be used concurrently.

The content of the binder in the heat resistant insulating layer is preferably 2 to 20% by mass with respect to 100% by mass of the heat resistant insulating layer. When the content of the binder is 2% by mass or more, the peeling strength between the heat resistant insulating layer and the resin film can be enhanced and vibration resistance of the separator can be improved. On the other hand, when the content of the binder is 20% by mass or less, a gap between the inorganic particles is properly kept so that sufficient lithium ion conductivity can be secured.

The present invention is mainly characterized in that, in the non-aqueous electrolyte secondary battery having a capacity and a size which are assumed to increase the capacity, a separator in which each parameter in the separator is a value in a predetermined range is used. Specifically, a value R of the separator represented by the following Formula 1:

$$R = \frac{\text{Tortuosity factor} \times \text{Thickness [µm]}}{\text{Porosity}} \quad \text{(Formula 1)}$$

is 62 to 110.

Provided that, in Formula 1, the tortuosity factor is a value represented by the following Formula 2:

$$\text{Tortuosity factor} = \sqrt{\frac{\text{Air permeability [sec/100 ml]} \times \text{Average pore diameter [µm]} \times \text{Porosity}}{\text{Thickness [µm]} \times 25 \times 5.18 \times 10^{-3}}} \quad \text{(Formula 2)}$$

At this time, it is essential that the average pore diameter is 0.10 to 0.18 µm, the porosity is 0.43 to 0.65, the air permeability is 140 to 305 sec/100 ml, and the thickness is 11 to 25 µm. Hereinafter, respective parameters will be sequentially described.

The average pore diameter of the separator is essentially in a range of 0.10 to 0.18 µm and preferably 0.13 to 0.15 µm. When the average pore diameter is less than 0.10 µm, sufficient ion conductivity is not obtainable, and cycle durability in the battery may be degraded. On the other hand, when the average pore diameter is more than 0.18 µm, the mechanical strength of the separator is decreased, and there is a concern that occurrence of internal short-circuit in the power generating element when the battery is damaged from the outside cannot be suppressed. Incidentally, in the present specification, as the average pore diameter, a value obtained by a measurement method using a mercury porosimeter described in Examples described later is employed.

The porosity of the separator is essentially in a range of 0.43 to 0.65 and preferably 0.46 to 0.55. When the porosity is less than 0.43, sufficient ion conductivity is not obtainable, and cycle durability in the battery may be degraded. On the other hand, when the average pore diameter is more than 0.65, the mechanical strength of the separator is decreased, and there is a concern that occurrence of internal short-circuit in the power generating element when the battery is damaged from the outside cannot be suppressed. Incidentally, in the present specification, as the porosity, a value obtained by a measurement method using a mercury porosimeter described in Examples described later is employed.

The air permeability of the separator is essentially in a range of 140 to 305 sec/100 ml and preferably 160 to 250 sec/100 ml. When the air permeability is less than 140 sec/100 ml, the mechanical strength of the separator is decreased, and there is a concern that occurrence of internal short-circuit in the power generating element when the battery is damaged from the outside cannot be suppressed. On the other hand, when the air permeability is more than 305 sec/100 ml, sufficient ion conductivity is not obtainable, and cycle durability in the battery may be degraded. Incidentally, in the present specification, as the air permeability, a value obtained by a measurement method using a mercury porosimeter described in Examples described later is employed.

The thickness (whole thickness) of the separator is essentially in a range of 11 to 25 µm and preferably 14 to 22 µm. When the thickness is less than 11 µm, the mechanical strength of the separator is decreased, and there is a concern that occurrence of internal short-circuit in the power generating element when the battery is damaged from the outside cannot be suppressed. On the other hand, when the thickness is more than 25 µm, sufficient ion conductivity is not obtainable, and cycle durability in the battery may be degraded. Incidentally, the thickness of the separator described herein means the whole thickness of the separator. As described above, in a case where the separator includes a laminate of a resin film having a three-layer structure and a heat resistant insulating layer, the total of the thickness of the resin film and the thickness of the heat resistant insulating layer is the thickness of the separator.

In the non-aqueous electrolyte secondary battery according to this embodiment, in addition to the average pore diameter, the porosity, the air permeability, and the thickness of the separator being in a specific numerical value range, it is essential that the value R represented by the above Formula 1 is in a range of 62 to 110. In Formula 1, the tortuosity factor is obtained by the above Formula 2. Incidentally, Formula 2 can be derived from Formula (7.1) described in "Lithium Ion Secondary Battery: Material and Application," written by Masayuki Yoshio and Akiya Ozawa, published by NIKKAN KOGYO SHIMBUN, LTD., 1996, 3, p. 97. In the above Formula 2, the air permeability measured by the ASTM method described in Formula (7.1) is converted into the air permeability measured by the JIS method.

In this embodiment, the tortuosity factor of the separator is not particularly limited but is preferably 2.02 to 2.91 and more preferably 2.02 to 2.40. When the tortuosity factor is 2.02 or more, sufficient voltage resistance may be obtainable. On the other hand, when the tortuosity factor is 2.91 or less, sufficient ion conductivity is obtainable and the cycle durability in the battery may be improved.

In this embodiment, the value R represented by the above Formula 1 is essentially 62 to 110. When R is less than 62, the mechanical strength of the separator is decreased, and there is a concern that occurrence of internal short-circuit in the power generating element when the battery is damaged from the outside cannot be suppressed. On the other hand, when R is more than 110, sufficient ion conductivity is not obtainable, and cycle durability in the battery may be degraded.

According to a preferable embodiment, R is preferably 91 to 110. When R is in this range, particularly, the mechanical strength of the separator is improved and occurrence of internal short-circuit can be further suppressed, which is preferable particularly in view of safety of the battery. Further, according to another preferable embodiment, R is preferably 81 to 90. When R is in this range, particularly, both the mechanical strength of the separator and the ion conductivity are improved, so that both the effect of preventing internal short-circuit and the effect of improving cycle durability may be exhibited at a further higher level. Further, according to still another preferable embodiment, R is preferably 62 to 80. When R is in this range, particularly, the ion conductivity of the separator is improved, charge and discharge reactions in the thickness direction of the electrode proceed more uniformly, and high cycle durability can be exhibited, which is preferable particularly in view of an increase in service life of the battery.

According to a particularly preferable embodiment, R is 91 to 110, the average pore diameter is 0.10 to 0.17 µm, the porosity is 0.43 to 0.55, the air permeability is 155 to 305 sec/100 ml, and the thickness is 11 to 25 µm. According to another particularly preferable embodiment, R is 81 to 90, the average pore diameter is 0.16 to 0.18 µm, the porosity is 0.54 to 0.65, the air permeability is 140 to 165 sec/100 ml, and the thickness is 14 to 22 µm. According to still another particularly preferable embodiment, R is 62 to 80, the average pore diameter is 0.15 to 0.18 µm, the porosity is 0.52 to 0.65, the air permeability is 140 to 160 sec/100 ml, and the thickness is 11 to 22 µm.

In this embodiment, the method for controlling the respective parameters (the average pore diameter, the porosity, the air permeability, the thickness, and R) of the separator to the above ranges is not particularly limited, and it is possible for a person skilled in the art to appropriately control the respective parameters while making allowance for the description of the specification of the present application and the technical common knowledge at the time of filing the present application. For example, the respective parameters can be controlled by regulating the material constituting the resin film (and, in a case where the separator includes a heat resistant insulating layer described later, the heat resistant insulating layer) constituting the separator and the method for producing the resin film (and the heat resistant insulating layer).

Herein, as a method for producing a porous resin film as a preferable embodiment of the resin film, a conventionally known method such as a wet method or a stretching method is used.

As a method for producing an olefin-based porous resin film by a wet method, for example, there is exemplified a method in which an olefin-based resin composition obtained by mixing an olefin-based resin, a filler, and a plasticizer is formed to obtain an olefin-based resin film and the filler and the plasticizer are extracted from the olefin-based resin film to obtain an olefin-based porous resin film in which micropores are formed. Meanwhile, as a method for producing an olefin-based porous resin film by a stretching method, there is exemplified a method in which an olefin-based resin film containing an olefin-based resin is stretched uniaxially or biaxially to obtain an olefin-based porous resin film in which micropores are formed.

Among them, an olefin-based porous resin film produced by a stretching method is more preferable as the olefin-based porous resin film. The olefin-based porous resin film produced by the stretching method is likely to undergo thermal shrinkage at high temperature due to residual strain caused by stretching. Therefore, by subjecting such an olefin-based porous resin film to a treatment for heat resistance as described later, a separator satisfying a parameter according to the present invention can be realized.

Specific examples of the method for producing the olefin-based porous resin film by the stretching method include a method such as a method of extruding an olefin-based resin to obtain an olefin-based resin film, generating and growing lamella crystals in the olefin-based resin film, and stretching the olefin-based resin film to separate the lamella crystals from each other, whereby an olefin-based porous resin film having micropores formed therein is obtained; and a method of extruding an olefin-based resin composition obtained by mixing an olefin-based resin and a filler to obtain an olefin-based resin film and stretching the olefin-based resin film uniaxially or biaxially to separate the olefin-based resin from the filler at their interfaces, whereby an olefin-based porous resin film having micropores formed therein is obtained. The former method is preferable since an olefin-based porous resin film with a large number of micropores uniformly formed is obtained.

Particularly preferable examples of the method of producing the olefin-based resin porous film include a method including the following steps: an extruding step of melting and kneading an olefin-based resin in an extruder at a temperature equal to or higher than a temperature higher by 20° C. than the melting point of the olefin-based resin and equal to or lower than a temperature higher by 100° C. than the melting point of the olefin-based resin and then extruding the resultant olefin-based resin from a T die attached to the tip end of the extruder to thereby obtain an olefin-based resin film; an aging step of, after the extruding step, aging the olefin-based resin film at a temperature equal to or higher than a temperature lower by 30° C. than the melting point of the olefin-based resin and equal to or lower than a temperature lower by 1° C. than the melting point of the olefin-based resin; a first stretching step of, after the aging step, stretching the olefin-based resin film uniaxially at a stretching ratio of 1.2 to 1.6 times at a surface temperature of −20° C. or higher and lower than 100° C.; a second stretching step of stretching the olefin-based resin film subjected to stretching in the first stretching step uniaxially at a stretching ratio of 1.2 to 2.2 times at a surface temperature of 100 to 150° C.; and an annealing step of annealing the olefin-based resin film subjected to stretching in the second stretching step.

According to the method, an olefin-based resin porous film with a large number of micropores, which communicate with each other, uniformly formed can be obtained. Therefore, by using such an olefin-based resin porous film as the separator, each parameter in the aforementioned separator is easily controlled to a value in a predetermined range. In addition, since a large number of micropores are uniformly formed, the olefin-based resin porous film obtained by the method has excellent air permeability, and lithium ions can permeate the film smoothly and uniformly. Therefore, by applying such an olefin-based resin porous film as a porous substrate film to the separator, the internal resistance of the non-aqueous electrolyte secondary battery can be reduced, and such a non-aqueous electrolyte secondary battery can be charged and discharged at a high current density in high-power applications such as vehicles including electric vehicles and the like. Further, even in a case where overcharging or the like occurs and thus the temperature inside the battery increases, the occurrence of an electric short circuit between the positive electrode and the negative electrode can be highly suppressed, and as a result, safety of the battery can be sufficiently secured.

(Extruding Step)

The olefin-based resin film containing the olefin-based resin can be produced by supplying the olefin-based resin to the extruder, melting and kneading the olefin-based resin, and then extruding the resultant olefin-based resin from the T die attached to the tip end of the extruder.

The temperature of the olefin-based resin when melted and kneaded in the extruder is preferably equal to or higher than a temperature higher by 20° C. than the melting point of the olefin-based resin and equal to or lower than a temperature higher by 100° C. than the melting point of the olefin-based resin, more preferably equal to or higher than a temperature higher by 25° C. than the melting point of the olefin-based resin and equal to or lower than a temperature higher by 80° C. than the melting point of the olefin-based resin, and particularly preferably equal to or higher than a temperature higher by 25° C. than the melting point of the olefin-based resin and equal to or lower than a temperature higher by 50° C. than the melting point of the olefin-based resin. By setting the temperature of the olefin-based resin during melting and kneading to a temperature equal to or higher than a temperature higher by 20° C. than the melting point of the olefin-based resin, an olefin-based resin porous film having a uniform thickness can be obtained. In addition, by setting the temperature of the olefin-based resin during melting and kneading to a temperature equal to or lower than a temperature higher by 100° C. than the melting point of the olefin-based resin, the orientation of the olefin-based resin is improved and thus the generation of lamellas can be accelerated.

The draw ratio when the olefin-based resin is extruded from the extruder into a film shape is preferably 50 to 300, more preferably 65 to 250, and particularly preferably 70 to 250. By setting the draw ratio when the olefin-based resin is extruded from the extruder into a film shape to 50 or more, the tension applied to the olefin-based resin is increased, and accordingly, olefin-based resin molecules are sufficiently oriented so that the generation of lamellas can be accelerated. Further, by setting the draw ratio when the olefin-based resin is extruded from the extruder into a film shape to 300 or less, the film-forming stability of the olefin-based resin film is improved so that an olefin-based resin porous film having a uniform thickness and width can be obtained. Incidentally, the draw ratio is a value obtained by dividing the clearance of the lip of the T die by the thickness of the olefin-based resin film extruded from the T die. The clearance of the lip of the T die is measured as follows. The measurement of the clearance of the lip of the T die is performed at 10 or more sites using a feeler gauge according to JIS B7524 (2008) (for example, JIS feeler gauge manufactured by Nagai Gauges), and the arithmetic average of the measured values is computed. Further, the thickness of the olefin-based resin film extruded from the T die is measured as follows. The measurement of the thickness of the olefin-based resin film extruded from the T die is performed at 10 or more sites using a dial gauge (for example, Signal ABS Digimatic Indicator, manufactured by Mitutoyo Corporation), and the arithmetic average of the measured values is computed.

Further, the film-forming rate of the olefin-based resin film is preferably 10 to 300 m/min, more preferably 15 to 250 m/min, and particularly preferably 15 to 30 m/min. By setting the film-forming rate of the olefin-based resin film to 10 m/min or more, the tension applied to the olefin-based resin is improved, and accordingly, olefin-based resin molecules are sufficiently oriented so that the generation of lamellas can be accelerated. In addition, by setting the film-forming rate of the olefin-based resin film to 300 m/min or less, the film-forming stability of the olefin-based resin film is improved so that an olefin-based resin porous film having a uniform thickness and width can be obtained.

Then, when the olefin-based resin film extruded from the T die is cooled until the surface temperature thereof becomes equal to or lower than a temperature lower by 100° C. than the melting point of the olefin-based resin, the olefin-based resin forming the olefin-based resin film is crystallized, and lamellas are generated to a high degree. In addition, the kneaded molten olefin-based resin is extruded to orient the olefin-based resin molecules constituting the olefin-based resin film in advance, and the olefin-based resin film in this state is cooled. In this manner, the generation of lamellas can be accelerated in portions where the olefin-based resin is oriented.

The surface temperature of the cooled olefin-based resin film is preferably equal to or lower than a temperature lower by 100° C. than the melting point of the olefin-based resin, more preferably lower by 140 to 110° C. than the melting point of the olefin-based resin, and particularly preferably lower by 135 to 120° C. than the melting point of the olefin-based resin. By cooling the olefin-based resin film to such a surface temperature, the olefin-based resin forming the olefin-based resin film can be sufficiently crystallized.

(Aging Step)

Next, the olefin-based resin film obtained in the extruding step described above is aged. The aging step for the olefin-based resin is performed in order to grow the lamella generated in the olefin-based resin film in the extruding step. In this manner, a laminated lamella structure in which crystallized portions (lamellas) and non-crystallized portions are arranged alternately in the extrusion direction of the olefin-based resin film can be formed. Therefore, in the stretching steps of the olefin-based resin film described later, cracks are formed not in the lamellas but between the lamellas, and micropores starting from these cracks can be formed.

In the aging step, the olefin-based resin film obtained in the extruding step is aged at a temperature equal to or higher than a temperature lower by 30° C. than the melting point of the olefin-based resin and equal to or lower than a temperature lower by 1° C. than the melting point of the olefin-based resin.

The aging temperature of the olefin-based resin film is preferably equal to or higher than a temperature lower by 30° C. than the melting point of the olefin-based resin and equal to or lower than a temperature lower by 1° C. than the melting point of the olefin-based resin and more preferably equal to or higher than a temperature lower by 25° C. than the melting point of the olefin-based resin and equal to or lower than a temperature lower by 10° C. than the melting point of the olefin-based resin. By setting the aging temperature of the olefin-based resin film to a temperature equal to or higher than a temperature lower by 30° C. than the melting point of the olefin-based resin, the crystallization of the olefin-based resin film is accelerated, and micropores can be easily formed between lamellas of the olefin-based resin film in the stretching step described later. In addition, by setting the aging temperature of the olefin-based resin film to a temperature equal to or lower than a temperature lower by 1° C. than the melting point of the olefin-based resin, the collapse of the lamella structure due to relaxation of the molecular orientation of the olefin-based resin forming the olefin-based resin film can be reduced.

Incidentally, the aging temperature of the olefin-based resin film is the surface temperature of the olefin-based resin film. However, in a case where the surface temperature of the olefin-based resin film cannot be measured, for example, in a case where the olefin-based resin film wound into a roll is aged, the ambient temperature is used as the aging temperature of the olefin-based resin film. For example, in a case where the olefin-based resin film wound into a roll is aged inside a heating apparatus such as a hot-air oven, the temperature inside the heating apparatus is used as the aging temperature.

The olefin-based resin film may be aged while the olefin-based resin film is running or in a state of the olefin-based resin film being wound into a roll.

In a case where the olefin-based resin film may be aged while the olefin-based resin film is running, the aging time of the olefin-based resin film is preferably 1 minute or longer and more preferably 5 minutes to 60 minutes.

In a case where the olefin-based resin film wound into a roll is aged, the aging time is preferably 1 hour or longer and more preferably 15 hours or longer. By aging the olefin-based resin film wound into a roll for such an aging time, the olefin-based resin film as a whole from the surface of the roll to the inside thereof can be sufficiently aged by setting the temperature of the olefin-based resin film to the aging temperature described above, and lamellas of the olefin-based resin film can be sufficiently grown. In addition, in order to suppress thermal degradation of the olefin-based resin film, the aging time is preferably 35 hours or shorter and more preferably 30 hours or shorter.

Incidentally, in a case where the olefin-based resin film wound into a roll is aged, the stretching steps and annealing step described later may be performed on the olefin-based resin film unwound from the roll of the olefin-based resin film subjected to the aging step.

(First Stretching Step)

Next, the olefin-based resin film after the aging step is subjected to the first stretching step in which the olefin-based resin film is uniaxially stretched at a stretching ratio of 1.2 to 1.6 times and a surface temperature of −20° C. or higher and lower than 100° C. In the first stretching step, it is preferable to stretch the olefin-based resin film uniaxially only in the extrusion direction. In the first stretching step, almost no lamellas in the olefin-based resin film are melted. By separating the lamellas from each other by stretching, fine cracks are independently formed in non-crystalline portions between the lamellas in an efficient manner, and a large number of micropores starting from the cracks are formed in a reliable manner.

In the first stretching step, the surface temperature of the olefin-based resin film is preferably −20° C. or higher and lower than 100° C., more preferably 0 to 80° C., and particularly preferably 10 to 40° C. By setting the surface temperature of the olefin-based resin film to −20° C. or higher, breakage of the olefin-based resin film during stretching can be reduced. In addition, by setting the surface temperature of the olefin-based resin film to lower than 100° C., cracks can be generated in the non-crystalline portions between the lamellas.

In the first stretching step, the stretching ratio of the olefin-based resin film is preferably 1.2 to 1.6 times and more preferably 1.25 to 1.5 times. By setting the stretching ratio of the olefin-based resin film to 1.2 times or more, micropores are formed in the non-crystalline portions between the lamellas, and accordingly, it is possible to provide an olefin-based resin porous film which is excellent in air permeability and has a low resistance when lithium ions permeates the film. In addition, by setting the stretching ratio of the olefin-based resin film to 1.6 times or less, micropores can be uniformly formed in the olefin-based resin porous film. By applying the olefin-based resin porous film obtained in this way to the separator, each parameter in the separator is easily controlled to a value in a predetermined range. Incidentally, in the present invention, the stretching ratio of the olefin-based resin film is a value obtained by dividing the length of the olefin-based resin film after stretching by the length of the unstretched olefin-based resin film before stretching.

The stretching speed of the olefin-based resin film in the first stretching step is preferably 20%/min or more. By setting the stretching speed to 20%/min or more, micropores can be uniformly formed in the non-crystalline portions between the lamellas. In addition, the stretching speed of the olefin-based resin film in the first stretching step is more preferably 20 to 500%/min and particularly preferably 20 to 70%/min. By setting the stretching speed to 500%/min or less, breakage of the olefin-based resin film can be suppressed.

Incidentally, the stretching speed of the olefin-based resin film is a ratio of a change in dimension per unit time in the stretching direction of the olefin-based resin film.

The method of stretching the olefin-based resin film in the first stretching step is not particularly limited as long as the olefin-based resin film can be stretched uniaxially. Examples thereof include a method such as a method in which the olefin-based resin film is stretched uniaxially at a predetermined temperature using a uniaxial stretching apparatus.

(Second Stretching Step)

Next, the olefin-based resin film subjected to the first stretching step is subjected to the second stretching step in which the olefin-based resin film is subjected to uniaxial stretching treatment at a stretching ratio of 1.2 to 2.2 times and a surface temperature of 100 to 150° C. Also in the second stretching step, it is preferable to stretch the olefin-based resin film uniaxially only in the extrusion direction. By performing such stretching treatment in the second stretching step, a large number of micropores formed in the olefin-based resin film in the first stretching step can be grown.

In the second stretching step, the surface temperature of the olefin-based resin film is preferably 100 to 150° C. and more preferably 110 to 140° C. By setting the surface temperature of the olefin-based resin film to 100° C. or higher, micropores formed in the olefin-based resin film in the first stretching step are grown, and thus the air permeability of the olefin-based resin porous film can be improved. In addition, by setting the surface temperature of the olefin-based resin film to 150° C. or lower, clogging of the micropores formed in the olefin-based resin film in the first stretching step can be suppressed.

In the second stretching step, the stretching ratio of the olefin-based resin film is preferably 1.2 to 2.2 times and more preferably 1.5 to 2 times. By the stretching ratio of the olefin-based resin film to 1.2 times or more, micropores formed in the olefin-based resin film in the first stretching step are grown, and thus it is possible to provide an olefin-based resin porous film having excellent air permeability. In addition, by setting the stretching ratio of the olefin-based resin film to 2.2 times or less, clogging of the micropores formed in the olefin-based resin film in the first stretching step can be suppressed.

In the second stretching step, the stretching speed of the olefin-based resin film is preferably 500%/min or less, more preferably 400%/min or less, and particularly preferably 15 to 60%/min. By the stretching speed of the olefin-based resin film in the above range, micropores can be uniformly formed in the olefin-based resin film. By applying the olefin-based resin porous film obtained in this way to the separator, each parameter in the separator is easily controlled to a value in a predetermined range.

The method of stretching the olefin-based resin film in the second stretching step is not particularly limited as long as the olefin-based resin film can be stretched uniaxially. Examples thereof include a method such as a method in which the olefin-based resin film is stretched uniaxially at a predetermined temperature using a uniaxial stretching apparatus.

(Annealing Step)

Next, the annealing step in which the olefin-based resin film stretched in the second stretching step is subjected to annealing treatment is performed. The annealing step is performed in order to relax residual strain generated in the olefin-based resin film due to stretching performed in the above-described stretching steps to thereby suppress the occurrence of thermal shrinkage in the obtained olefin-based resin microporous film.

The surface temperature of the olefin-based resin film in the annealing step is preferably equal to or higher than the surface temperature of the olefin-based resin film in the second stretching step and equal to or lower than a temperature lower by 10° C. than the melting point of the olefin-based resin. By setting the surface temperature of the olefin-based resin film to a temperature equal to or higher than the surface temperature of the olefin-based resin film in the second stretching step, the residual strain in the olefin-based resin film is sufficiently relaxed, and thus the dimensional stability of the olefin-based resin porous film thus obtained during heating can be improved. In addition, by setting the surface temperature of the olefin-based resin film to a temperature equal to or lower than a temperature lower by 10° C. than the melting point of the olefin-based resin, clogging of the micropores formed in the olefin-based resin film in the stretching steps can be suppressed.

The shrinkage ratio of the olefin-based resin film in the annealing step is preferably set to 20% or less. By setting the shrinkage ratio of the olefin-based resin film to 20% or less, the occurrence of slack in the olefin-based resin film is reduced, and thus the olefin-based resin film can be uniformly annealed. Incidentally, the shrinkage ratio of the olefin-based resin film is a value obtained by dividing the shrinkage length of the olefin-based resin film in the stretching direction in the annealing step by the length of the olefin-based resin film in the stretching direction after the second stretching step and then multiplying the quotient by 100.

By appropriately controlling the conditions and the methods (for example, the cooling rate after extraction, the stretching ratio, the stretching speed, and crystal transformation) in the above-described respective steps, each parameter in the separator when an olefin-based porosity to be obtained is applied to the separator can be adjusted to a value in a predetermined range.

As described above, the separator contains an electrolyte. The electrolyte is not particularly limited as long as it can exhibit such functions, but a liquid electrolyte or a gel polymer electrolyte may be used. The distance between electrodes is stabilized, an occurrence of polarization is suppressed, and the cycle durability is improved as a gel polymer electrolyte is used.

(Electrolyte)

The liquid electrolyte has a function as a carrier of lithium ion. The liquid electrolyte constituting the electrolyte solution layer has a form in which a lithium salt as a supporting salt is dissolved in an organic solvent as a plasticizer. Examples of the organic solvent which can be used include carbonates such as ethylene carbonate (EC), propylene carbonate (PC), dimethyl carbonate (DMC), diethyl carbonate (DEC), and ethylmethyl carbonate (EMC). Further, as the lithium salt, a compound which may be added to an active material layer of an electrode, such as $Li(CF_3SO_2)_2N$, $Li(C_2F_5SO_2)_2N$, $LiPF_6$, $LiBF_4$, $LiClO_4$, $LiAsF_6$, $LiTaF_6$, and $LiCF_3SO_3$, can be adopted in the same manner. The liquid electrolyte may further contain an additive in addition to the components described above. Specific examples of such a compound include vinylene carbonate, methyl vinylene carbonate, dimethyl vinylene carbonate, phenyl vinylene carbonate, diphenyl vinylene carbonate, ethyl vinylene carbonate, diethyl vinylene carbonate, vinyl ethylene carbonate, 1,2-divinyl ethylene carbonate, 1-methyl-1-vinyl ethylene carbonate, 1-methyl-2-vinyl ethylene carbonate, 1-ethyl-1-vinyl ethylene carbonate, 1-ethyl-2-vinyl ethylene carbonate, vinyl vinylene carbonate, allyl ethylene carbonate, vinyloxymethyl ethylene carbonate, allyloxymethyl ethylene carbonate, acryloxymethyl ethylene carbonate, methacryloxymethyl ethylene carbonate, ethynyl ethylene carbonate, propargyl ethylene carbonate, ethynyloxymethyl ethylene carbonate, propargyloxyethylene carbonate, methylene ethylene carbonate, 1,1-dimethyl-2-methylene ethylene carbonate, and the like. Among them, vinylene carbonate, methyl vinylene carbonate, and vinyl ethylene carbonate are preferable, and vinylene carbonate and vinyl ethylene carbonate are more preferable. These cyclic carbonates may be used singly or two or more kinds thereof may be used concurrently.

The gel polymer electrolyte has a configuration in which the above-described liquid electrolyte is injected into a matrix polymer (host polymer) consisting of an ion conductive polymer. Using a gel polymer electrolyte as an electrolyte is excellent in that the fluidity of the electrolyte disappears and ion conductivity between the respective layers is blocked. Examples of the ion conductive polymer which is used as the matrix polymer (host polymer) include polyethylene oxide (PEO), polypropylene oxide (PPO), polyethylene glycol (PEG), polyacrylonitrile (PAN), polyvinylidene fluoride-hexafluoropropylene (PVdF-HEP), poly(methyl methacrylate (PMMA), a copolymer thereof, and the like.

The matrix polymer of the gel electrolyte can exhibit an excellent mechanical strength as it forms a cross-linked structure. In order to form a cross-linked structure, it is sufficient to conduct a polymerization treatment, such as thermal polymerization, UV polymerization, radiation polymerization, or electron beam polymerization, of a polymerizable polymer for forming a polymer electrolyte (for example, PEO or PPO) using a proper polymerization initiator.

[Positive Electrode Current Collecting Plate and Negative Electrode Current Collecting Plate]

The material of the current collecting plate (25, 27) is not particularly limited, and a known highly conductive material which has been used as a current collecting plate for a lithium ion secondary battery in the related art can be used. Preferred examples of the material constituting the current collecting plate include metal materials such as aluminum, copper, titanium, nickel, stainless steel (SUS), and an alloy thereof. From the viewpoint of light weightiness, resistance to corrosion, and high conductivity, aluminum and copper are more preferable, and aluminum is particularly preferable. Incidentally, the same material or different materials may be used in the positive electrode current collecting plate 27 and the negative electrode current collecting plate 25.

[Positive Electrode Lead and Negative Electrode Lead]

Further, although it is not illustrated, the current collector 11 and the current collecting plate (25, 27) may be electrically connected to each other via a positive electrode lead or a negative electrode lead. A known material that is used in a lithium ion secondary battery of the related art can be used as the material constituting the positive electrode lead and the negative electrode lead in the same manner. Incidentally, a portion taken out from the outer casing is preferably coated with a heat resistant and insulating thermally shrunken tube or the like so that it is not in contact with the neighboring device, wire, or the like to cause electric leakage which affects the product (for example, an automobile component, in particular, an electronic device or the like).

[Battery Outer Casing Body]

As the battery outer casing body 29, an envelope-shaped casing which can cover the power generating element and uses a laminate film containing aluminum can be used in addition to a known metal can casing. As the laminate film, a laminate film such as a laminate film having a three-layer structure formed by laminating PP, aluminum, and nylon in this order can be used, but it is not limited thereto. A laminate film is preferable and an aluminate laminate is more preferable from the viewpoint of an increase in output and excellent cooling performance and of being suitably utilizable in a battery for a large-sized device for EV or HEV.

[Cell Size]

Figure 2:
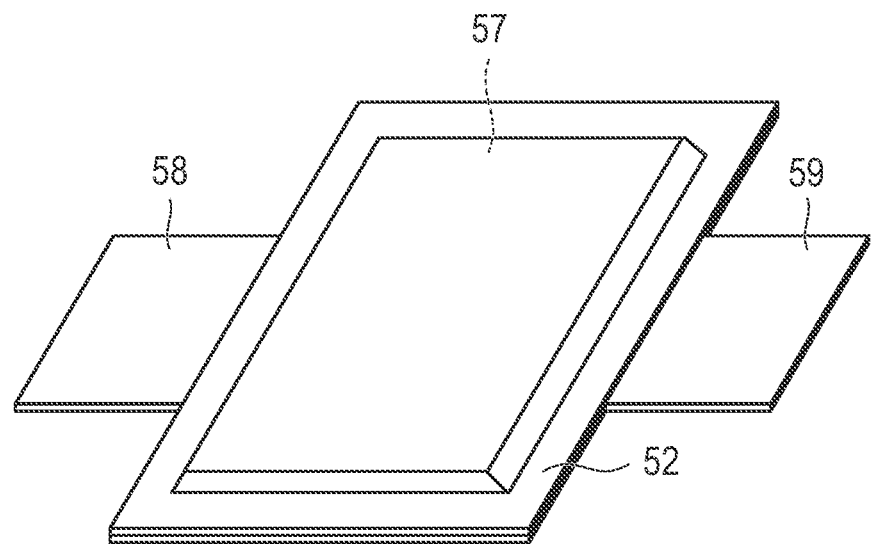
FIG. 2 is a perspective view illustrating an appearance of a flat lithium ion secondary battery as a representative embodiment of the non-aqueous electrolyte secondary battery.

FIG. 2 is a perspective view illustrating an appearance of a flat lithium ion secondary battery as a representative embodiment of the secondary battery. According to a preferred embodiment of the present invention, a flat stack type laminate battery obtained by sealing the power generating element in a battery outer casing body formed of a laminate film containing aluminum such as this lithium ion secondary battery is provided. When the battery is a flat stack type laminate in this way, the capacity can be increased.

As illustrated in FIG. 2, a flat lithium ion secondary battery 50 has a rectangular flat shape, and a positive electrode tab 58 and a negative electrode tab 59 are taken out from both sides for extracting the electric power. A power generating element 57 is covered with a battery outer casing body 52 of the lithium ion secondary battery 50 and the periphery of the battery outer casing body 52 is fused by heat. The power generating element 57 is sealed in a state where the positive electrode tab 58 and the negative electrode tab 59 are taken out to the outside. Herein, the power generating element 57 corresponds to the power generating element 21 of the lithium ion secondary battery 10 illustrated in FIG. 1 described above. The power generating element 57 is one in which a plurality of single battery layers (single cells) 19, which are each constituted by the positive electrode (positive electrode active material layer) 15, the electrolyte layer 17, and the negative electrode (negative electrode active material layer) 13 are laminated.

Incidentally, the lithium ion secondary battery is not limited to those having a flat shape of a laminate type. However, from the viewpoint of improving the energy density, a flat shape is preferable, and from the viewpoint that the capacity can be easily increased, a laminate type is more preferable. A winding type lithium ion secondary battery may be those having a barrel shape or those having a rectangular flat shape obtained by modifying those having a barrel shape, and it is not particularly limited. A laminate film may be used as the outer casing body of those having a barrel shape, and a barrel can (metal can) of the related art may be used, and it is not particularly limited. Preferably, the power generating element is encased with an aluminum laminate film. Weight saving can be attained by such a form.

In addition, the taking out of the tabs 58 and 59 illustrated in FIG. 2 is not particularly limited as well. The positive electrode tab 58 and the negative electrode tab 59 may be taken out from the same side or each of the positive electrode tab 58 and the negative electrode tab 59 may be divided into a plurality of tabs and then taken out from each side, and it is not limited to the form illustrated in FIG. 2. Further, in the winding type lithium ion battery, the tabs may be substituted with terminals formed by utilizing a barrel can (metal can), for example.

(Ratio of Battery Area to Rated Capacity and Rated Capacity)

A general electric vehicle has a battery storage space of about 170 L. A cell and an auxiliary machine such as a device for controlling charge and discharge are stored in this space, and thus the storage space efficiency of a common cell is about 50%. The cell loading efficiency into this space is a factor to determine the cruising distance of an electric vehicle. The loading efficiency is impaired as the size of the single cell decreases, and thus it is not possible to secure the cruising distance.

According to the market requirement, a general electric vehicle needs to have a driving distance (cruising distance) of 350 km per one charge. Considering such a cruising distance, the volume energy density of the battery is preferably 400 Wh/L or more. Based on this, the present inventors have conducted studies on a non-aqueous electrolyte secondary battery having a volume energy density of 400 Wh/L or more, thereby completing the present invention.

Further, in the present invention, the battery structure of which the power generating element is covered with an outer casing body preferably has a large size. As described above, since a high energy density of the battery is achieved by increasing the size of the battery, the effect of the present invention is significantly exerted. Specifically, in the non-aqueous electrolyte secondary battery according to this embodiment, largeness of the battery is preferably defined from a relation between the battery area and the battery capacity. Specifically, the non-aqueous electrolyte secondary battery according to this embodiment has a ratio value of the battery area (a projected area of the battery including the battery outer casing body) to the rated capacity (rated discharge capacity) of 7 $cm^2$/Ah or more, preferably 8 $cm^2$/Ah or more. In view of high capacity, a higher ratio of the battery area (the projected area of the battery including the battery outer casing body) to the rated capacity is preferable, but in the relation with the in-vehicle volume, the ratio of the battery area to the rated capacity is usually 15 $cm^2$/Ah or less.

Further, in the non-aqueous electrolyte secondary battery according to this embodiment, the rated capacity is 50 Ah or more and preferably 60 Ah or more. A higher rated capacity is preferable, and the upper limit thereof is not particularly limited, but is usually 100 Ah or less and preferably 80 Ah or less. A preferable range of the rated capacity is preferably 50 to 100 Ah and more preferably 60 to 100 Ah. Incidentally, as the rated capacity, a value measured by a method described below is employed.

In a cell at the production stage, an electrolyte solution is injected into the cell, the cell is then left to stand still for about 10 hours, and the initial charging is performed. Thereafter, the rated capacity is measured by the following procedures 1 to 5 at a temperature of 25° C. and in a voltage range of 3.0 V to 4.15 V;

Procedure 1: After the voltage reaches 4.15 V at a constant current charge of 0.2 C, rest for 5 minutes;

Procedure 2: After the procedure 1, charge for 1.5 hours at a constant voltage charge, and then rest for 5 minutes;

Procedure 3: After the voltage reaches 3.0 V at a constant current discharge of 0.2 C, discharge for 2 hours at a constant voltage discharge, and then rest for 10 seconds;

Procedure 4: After the voltage reaches 4.15 V at a constant current charge of 0.2 C, charge for 2.5 hours at a constant voltage charge, and then rest for 10 seconds; and Procedure 5: After the voltage reaches 3.0 V at a constant current discharge of 0.2 C, discharge for 2 hours at a constant voltage discharge, and then rest for 10 seconds.

Rated capacity: Discharge capacity (CCCV discharge capacity) in discharge from a constant current discharge to a constant voltage discharge in the procedure 5 is regarded as the rated capacity.

Further, in the non-aqueous electrolyte secondary battery, the procedures 1 to 5 are performed in a similar manner, and discharge capacity (CCCV discharge capacity) in discharge from a constant current discharge to a constant voltage discharge in the procedure 5 is regarded as the rated capacity.

Further, regarding the physical size of the battery, the length of the short side of a laminate cell battery is preferably 100 mm or more. Such a large-sized battery can be used for a vehicle. Herein, the length of the short side of the laminate cell battery indicates a side having the shortest length. The upper limit of the length of the short side is not particularly limited, but is usually 400 mm or less.

Further, the aspect ratio of a rectangular electrode is preferably 1 to 3 and more preferably 1 to 2. Incidentally, the aspect ratio of the electrode is defined as the length/width ratio of a positive electrode active material layer with a rectangular shape. When the aspect ratio is in this range, an advantage of having both the performance required for a vehicle and mounting space can be achieved.

(Ratio of Rated Capacity to Pore Volume of Positive Electrode Active Material Layer)

Further, in the non-aqueous electrolyte secondary battery according to this embodiment, the ratio of the rated capacity to the pore volume of the positive electrode active material layer is preferably 2.08 Ah/cc or more and preferably 2.5 Ah/cc or more. The ratio value of the rated capacity to the pore volume of the positive electrode active material layer is an index showing diffusivity of lithium ions in the positive electrode active material layer. Herein, regarding the unit (g/cc) of the density (apparent density; bulk density) of the positive electrode active material layer, it is necessary to consider the density (true density) of the material itself constituting the positive electrode active material layer. For example, if the density (true density) of the material constituting a substantial part of the positive electrode active material layer is small, even when the same degree of pores exists in the same volume, as compared to a case where the density (true density) is large, the density (apparent density; bulk density) of the positive electrode active material layer is decreased, so that the density is not sufficient as an index indicating how much the material of the positive electrode active material layer is filled per unit volume. For this reason, herein, by defining the ratio of the rated capacity to the pore volume of the positive electrode active material layer, the defined ratio is used as an index of diffusivity of lithium ions in the positive electrode active material layer. Further, by increasing the capacity of the battery (increasing the rated capacity), lithium ions in the positive electrode active material layer increase; on the other hand, when the pore volume in the positive electrode active material layer is decreased, diffusivity of lithium ions is degraded. Therefore, the ratio of the rated capacity to the pore volume of the positive electrode active material layer becomes an index of diffusivity of lithium ions in the positive electrode active material layer.

Herein, according to the studies of the present inventors, it is found out that, even in an environment in which the ratio of the rated capacity to the pore volume of the positive electrode active material layer is 2.08 Ah/cc or more (preferably 2.5 Ah/cc or more), that is, diffusivity of lithium ions is low, by using the separator in which each parameter is controlled to a value in a predetermined range, cycle durability can be significantly improved while the internal short-circuit of the battery is sufficiently suppressed. Incidentally, in the present specification, as the pore volume of the positive electrode active material layer, a value obtained by a measurement method described in Examples is employed.

[Assembled Battery]

An assembled battery is constituted by connecting a plurality of batteries. In detail, the assembled battery is constituted by connecting at least two or more batteries in series, in parallel, or in series and parallel. It is possible to freely control the capacity and voltage by connecting the batteries in series and in parallel.

It is also possible to form a detachable small-sized assembled battery by connecting plural batteries in series or in parallel. Moreover, by further connecting a plurality of detachable small-sized assembled batteries in series or parallel, it is possible to form an assembled battery having a high capacity and a high output which is suitable as a power source or an auxiliary power source for driving a vehicle requiring a high volume energy density and a high volume output density. The number of the connected batteries for producing an assembled battery or the number of the laminated small-sized assembled batteries for producing an assembled battery having a high capacity may be determined depending on the capacity or output of the battery that is mounted to a vehicle (electric vehicle).

A cell unit obtained by laminating a plurality of batteries in this way may be housed in upper and lower cases (for example, metal cases) to form an assembled battery. At this time, generally, the metal cases are fastened by a fastening member so that the assembled battery is accommodated in the cases. Therefore, the battery is pressurized in the laminating direction inside the cases.

[Vehicle]

The non-aqueous electrolyte secondary battery of this embodiment can maintain a discharge capacity even when being used for a long period of time and thus exhibits favorable cycle characteristics. Further, the volume energy density is high. For use in a vehicle such as an electric vehicle, a hybrid electric vehicle, a fuel cell electric vehicle, or a hybrid fuel cell electric vehicle, a long lifespan is required as well as a high capacity and a large size compared to use in an electric and mobile electronic device. Therefore, the non-aqueous electrolyte secondary battery can be suitable utilized as a power source for a vehicle, for example, as a power source or as an auxiliary power source for driving a vehicle.

Specifically, the battery or the assembled battery formed by combining a plurality of batteries can be mounted on a vehicle. In the present invention, a battery exhibiting excellent long term reliability, output characteristics, and a long lifespan can be formed, and thus, by mounting such a battery, a plug-in hybrid electric vehicle having a long EV driving distance and an electric vehicle having a long driving distance per one charge can be constituted. This is because a vehicle having a long lifespan and high reliability can be provided as the battery or an assembled battery formed by combining a plurality of batteries is used in, for example, a vehicle such as a hybrid car, a fuel cell electric car, or an electric car (including a two-wheel vehicle (motor bike) or a three-wheel vehicle in addition to all four-wheel vehicles (a passenger vehicle, a truck, a commercial vehicle such as a bus, a compact car, or the like)). However, the use is not limited to a vehicle, but the battery or the assembled battery can be applied to various kinds of power sources of other vehicles, for example, a moving object such as an electric train, and it can be also utilized as a built-in power source of an uninterruptable power source unit.

EXAMPLES

The present invention will be described by means of the following Examples. However, the technical scope of the present invention is not intended to be limited only to the following Examples.

Example 1

1. Production of Positive Electrode

A solid content consisting of 90% by mass of $LiNi_{0.5}Mn_{0.3}Co_{0.2}O_2$ (average particle diameter: 8 μm) as a positive electrode active material, 5% by mass of acetylene black as a conductive aid, and 5% by mass of polyvinylidene fluoride (PVdF) as a binder was prepared. To this solid content, an appropriate amount of N-methyl-2-pyrrolidone (NMP) as a slurry viscosity adjusting solvent was added to prepare a positive electrode active material slurry. Next, the positive electrode active material slurry was applied to both surfaces of an aluminum foil (thickness: 20 μm) as a current collector by using a die coater and subjected to pressing after being dried, thereby obtaining a positive electrode active material layer of 150 μm, a coating amount (weight per unit area) on one surface after drying of 21.5 mg/cm², a density of 3.3 g/cm³.

2. Production of Negative Electrode

A solid content consisting of 95% by mass of graphite powder (average particle diameter: 16 μm) as a negative electrode active material and 5% by mass of PVdF as a binder was prepared. To this solid content, an appropriate amount of N-methyl-2-pyrrolidone (NMP) as a slurry viscosity adjusting solvent was added to prepare a negative electrode active material slurry. Next, the negative electrode active material slurry was applied to both surfaces of a copper foil (10 μm) as a current collector by using a die coater and subjected to pressing after being dried, thereby obtaining a negative electrode having a thickness of the negative electrode active material layer of 140 μm, a coating amount (weight per unit area) on one surface after drying of 10.5 mg/cm², and a density of 1.4 g/cm³.

3. Production of Electrolyte Solution

A mixed solvent of ethylene carbonate (EC):diethyl carbonate (DEC)=50:50 (volume ratio) was prepared as a solvent. $LiPF_6$ as a lithium salt was dissolved at a concentration of 1.0 M in this mixed solvent. Further, 1.0% by mass of vinylene carbonate (VC), 1.0% by mass of propanesultone (PS), and 1.0% by mass of fluoroethylene carbonate (FEC) with respect to 100% by mass of the total of the mixed solvent and the lithium salt were added to prepare an electrolyte solution.

4. Production of Battery

As the separator, a separator having a thickness of 11 μm which includes a heat resistant insulating layer, which has a thickness 4 μm and contains 95% by mass of alumina and 5% by mass of polybutyl acrylate rubber as the binder, on one surface of a resin film having a thickness of 7 μm and a three-layer structure of polypropylene (PP)/polyethylene (PE)/polypropylene (PP) (the thicknesses of the respective layers are all the same) was prepared. The separator was set to have an air permeability of 155 sec/100 ml, an average pore diameter of 0.15 μm, and a porosity of 0.52.

Incidentally, the air permeability, the average pore diameter, and the porosity of the separator were measured by the following methods.

(Air Permeability)

The air permeability of each separator used in Examples and Comparative Examples was measured by the following method. That is, each air permeability at arbitrary 10 sites of the separator was measured according to JIS P8117 (2009) in the atmosphere of 23° C. and a relative humidity of 65% RH, and an average value thereof was regarded as a measurement value of the air permeability.

(Average Pore Diameter and Porosity)

The average pore diameter and the porosity of each separator used in Examples and Comparative Examples were obtained by pore distribution measurement by a mercury press-injection method using a mercury press-injection porosimeter. The average pore diameter was calculated from a mercury press-injection amount in a range of ϕ5 to 0.005 μm on the basis of the formula: each pore diameter×a mercury press-injection amount of each pore diameter÷total mercury press-injection amount. Further, regarding the porosity, the volume of pores present inside a separator sample was measured, and the porosity was calculated from the measurement value of the pore volume and an apparent volume of the sample on the basis of the formula: porosity= (sample pore volume/sample volume).

The positive electrode produced above was cut into a rectangular shape of 200×210 mm, and the negative electrode produced above was cut into a rectangular shape of 205×215 mm (24 sheets of positive electrodes and 25 sheets of negative electrodes). Further, the separator was cut into a rectangular shape of 206×216 mm (48 sheets of separators). The positive electrodes and the negative electrodes were alternately laminated via the separators to produce a power generating element (24-layer product).

Incidentally, regarding a 35-layer product described as the number of laminated layers being 35 in Table 1, a power generating element was produced by the following method. That is, the positive electrode produced above was cut into a rectangular shape of 200×210 mm, and the negative electrode produced above was cut into a rectangular shape of 205×215 mm (35 sheets of positive electrodes and 36 sheets of negative electrodes). Further, the separator was cut into a rectangular shape of 206×216 mm (70 sheets of separators). The positive electrodes and the negative electrodes were alternately laminated via the separators to produce a power generating element (35-layer product).

The obtained power generating element was placed in an outer casing body having a thickness of 150 μm and formed of an aluminum laminate film, and an electrolyte solution was injected thereinto. Further, under a vacuum condition, the outer casing body was sealed such that the electricity extracting tabs that were connected to both electrodes were led to outside, thereby producing a battery. The rated capacity (cell capacity) of the obtained battery was 60 Ah, the ratio of the rated capacity to the pore volume of the positive electrode active material layer was 2.5 Ah/cc, and the ratio value of the battery area to the rated capacity was 7 cm$^2$/Ah.

Incidentally, the rated capacity of the battery and the pore volume of the positive electrode active material layer were obtained by the following procedures.

(Measurement of Rated Capacity)

The rated capacity was measured by the following procedures 1 to 5 at a temperature of 25° C. and in a voltage range of 3.0 V to 4.15 V;

Procedure 1: After the voltage reaches 4.15 V at a constant current charge of 0.2 C, rest for 5 minutes;

Procedure 2: After the procedure 1, charge for 1.5 hours at a constant voltage charge, and then rest for 5 minutes;

Procedure 3: After the voltage reaches 3.0 V at a constant current discharge of 0.2 C, discharge for 2 hours at a constant voltage discharge, and then rest for 10 seconds;

Procedure 4: After the voltage reaches 4.15 V at a constant current charge of 0.2 C, charge for 2.5 hours at a constant voltage charge, and then rest for 10 seconds; and Procedure 5: After the voltage reaches 3.0 V at a constant current discharge of 0.2 C, discharge for 2 hours at a constant voltage discharge, and then rest for 10 seconds.

Rated capacity: Discharge capacity (CCCV discharge capacity) in discharge from a constant current discharge to a constant voltage discharge in the procedure 5 was regarded as the rated capacity.

(Porosity of Positive Electrode Active Material Layer)

The pore volume of the positive electrode active material layer was measured as follows. That is, the positive electrode active material layer was extracted from the non-aqueous electrolyte secondary battery and cut into a sample of 10 cm×10 cm. The volume of pores (micropores) present inside the sample was measured by pore distribution measurement by a mercury press-injection method using a mercury press-injection porosimeter. Further, the pore volume of the positive electrode active material layer was calculated from the pore volume of the positive electrode active material layer sample in consideration of the area of the positive electrode active material layer and the number of layers.

Comparative Example 1

As the separator, a separator having a thickness of 22 μm which includes a heat resistant insulating layer, which has a thickness of 4 μm and contains 95% by mass of alumina and 5% by mass of polybutyl acrylate rubber as the binder, on one surface of a resin film having a thickness of 18 μm and a single-layer structure of polypropylene (PP) was prepared. The separator was set to have an air permeability of 140 sec/100 ml, an average pore diameter of 0.19 μm, and a porosity of 0.55.

A battery was produced by the similar method to Example 1, except that the above-described separator was used; and the coating amount on one surface, the density, the cutting size, the number of sheets of each of the positive electrode and the negative electrode and the cutting size and the number of sheets of the separator were set to values described in the following Table 1. Further, the rated capacity (cell capacity) of the obtained battery and the ratio value of the battery area to the rated capacity are also presented in the following Table 1.

Comparative Examples 2 to 8

A battery was produced by the similar method to Comparative Example 1, except that the coating amount on one surface, the density, the cutting size, the number of sheets of each of the positive electrode and the negative electrode; and the whole thickness (the thickness of the resin film), the air permeability, the average pore diameter, the porosity, the cutting size, and the number of sheets of the separator were set to values described in the following Table 1. Further, the rated capacity (cell capacity) of the obtained battery and the ratio value of the battery area to the rated capacity are also presented in the following Table 1.

Examples 2 to 16 and Comparative Examples 9 to 26

A battery was produced by the similar method to Example 1, except that the coating amount on one surface, the density, the cutting size, the number of sheets of each of the positive electrode and the negative electrode; and the whole thickness (the thickness of the resin film), the air permeability, the average pore diameter, the porosity, the cutting size, and the number of sheets of the separator were set to values described in the following Table 1. Further, the rated capacity (cell capacity) of the obtained battery and the ratio value of the battery area to the rated capacity are also presented in the following Table 1.

<Evaluation of Battery>

(Cycle Durability Evaluation)

The battery produced in each of Examples and Comparative Examples was charged at a charging rate of 0.2 C until a cut off voltage of 4.2 V to have an initial charge capacity. After resting for 1 hour, the capacity at the time of discharging at a discharging rate of 0.2 C until a cut off voltage of 3.0 V was regarded as an initial discharge capacity. This charge and discharge cycle was repeated 1000 times. The ratio of the discharge capacity at the 1000th cycle to the initial discharge capacity was regarded as a capacity retention rate (%) and evaluated as cycle durability. The results are presented in the following Table 1. In Table 1, a case where the capacity retention rate is 90% or more is regarded as "◯," and a case where the capacity retention rate is less than 90% is regarded as "X."

(Insulation Property Evaluation)

Regarding the battery produced in each of Examples and Comparative Examples, the insulation property of the separator and occurrence of internal short-circuit were compared. Specifically, the insulation property of each separator and occurrence of internal short-circuit were compared in such a manner that the cell voltage was controlled to 4.15 V, a voltage after 5 seconds from the cell being penetrated using an iron rod having a diameter of 3 mm with a sharp end at a constant speed (10 mm/sec) was measured, and a difference (amount of decrease in voltage) between the voltage and the initial voltage was calculated. The results are presented in the following Table 1. In Table 1, a case where the amount of decrease in voltage is 10 mV or less is regarded as "◯," and a case where the amount of decrease in voltage is more than 10 mV is regarded as "X." When the amount of decrease in voltage is 10 mV or less, even if the battery is in a short-circuit state once, sufficient insulation property can be maintained.

TABLE 1

| | Configuration of resin film | Thickness (μm) | Air permeability (sec/100 ml) | Average pore diameter (μm) | Porosity | Tortuosity factor | R | Size of positive electrode (mm) | Size of negative electrode (mm) | Number of layers | Weight per unit area of positive electrode (mg/cm²) | Density of positive electrode (g/cm³) | Weight per unit area of negative electrode (mg/cm²) | Density of negative electrode (g/cm³) | Rated capacity/pore volume of positive electrode active material layer (Ah/cc) | Battery area/rated capacity (cm²/Ah) | Rated capacity (Ah) | Cycle durability Capacity retention rate (%) | Evaluation | Internal short-circuit Amount of decrease in voltage (mV) | Evaluation |
|---|---|---|---|---|---|---|---|---|---|---|---|---|---|---|---|---|---|---|---|---|---|
| Comparative Example 1 | Single-layer | 22 | 140 | 0.19 | 0.55 | 2.27 | 91 | 200 × 179 | 205 × 184 | 24 | 10.2 | 3.2 | 5.3 | 1.4 | 2.08 | 14.3 | 25 | 95.5 | ○ | 7 | ○ |
| Comparative Example 2 | Single-layer | 22 | 230 | 0.13 | 0.5 | 2.29 | 101 | 200 × 179 | 205 × 184 | 24 | 10.2 | 3.2 | 5.3 | 1.4 | 2.08 | 14.3 | 25 | 95 | ○ | 7 | ○ |
| Comparative Example 3 | Single-layer | 22 | 140 | 0.19 | 0.55 | 2.27 | 91 | 200 × 226 | 205 × 231 | 24 | 11.8 | 2.7 | 5.6 | 1.4 | 1.12 | 12.9 | 35 | 96 | ○ | 6 | ○ |
| Comparative Example 4 | Single-layer | 22 | 230 | 0.13 | 0.5 | 2.29 | 101 | 200 × 226 | 205 × 231 | 24 | 11.8 | 2.7 | 5.6 | 1.4 | 1.12 | 12.9 | 35 | 95 | ○ | 6 | ○ |
| Comparative Example 5 | Single-layer | 22 | 140 | 0.19 | 0.55 | 2.27 | 91 | 80 × 132 | 85 × 137 | 35 | 26 | 3.2 | 12.7 | 1.4 | 2.08 | 3.3 | 15 | 94.5 | ○ | 7 | ○ |
| Comparative Example 6 | Single-layer | 22 | 230 | 0.13 | 0.5 | 2.29 | 101 | 80 × 132 | 85 × 137 | 35 | 26 | 3.2 | 12.7 | 1.4 | 2.08 | 3.3 | 15 | 94 | ○ | 7 | ○ |
| Comparative Example 7 | Single-layer | 22 | 140 | 0.19 | 0.55 | 2.27 | 91 | 200 × 210 | 205 × 215 | 24 | 21.5 | 3.3 | 10.5 | 1.4 | 2.5 | 7.0 | 60 | 94.9 | ○ | 120 | X |
| Comparative Example 8 | Single-layer | 22 | 230 | 0.13 | 0.5 | 2.29 | 101 | 200 × 210 | 205 × 215 | 24 | 21.5 | 3.3 | 10.5 | 1.4 | 2.5 | 7.0 | 60 | 95 | ○ | 110 | X |
| Comparative Example 9 | Three-layer | 22 | 55 | 0.15 | 0.85 | 1.57 | 41 | 200 × 210 | 205 × 215 | 24 | 21.5 | 3.3 | 10.5 | 1.4 | 2.5 | 7.0 | 60 | 95 | ○ | 110 | X |

TABLE 1-continued

| | Configuration of resin film | Thickness (μm) | Air permeability (sec/100 ml) | Average pore diameter (μm) | Porosity | Tortuosity factor | R | Size of positive electrode (mm) | Size of negative electrode (mm) | Number of layers | Weight per unit area of positive electrode (mg/cm²) | Density of positive electrode (g/cm³) | Weight per unit area of negative electrode (mg/cm²) | Density of negative electrode (g/cm³) | Rated capacity/pore volume of positive electrode active material layer (Ah/cc) | Battery area/rated capacity (cm²/Ah) | Rated capacity (Ah) | Cycle durability Capacity retention rate (%) | Cycle durability Evaluation | Internal short-circuit Amount of decrease in voltage (mV) | Internal short-circuit Evaluation |
|---|---|---|---|---|---|---|---|---|---|---|---|---|---|---|---|---|---|---|---|---|---|
| Comparative Example 10 | Three-layer | 8 | 130 | 0.15 | 0.52 | 3.13 | 48 | 200 × 210 | 205 × 215 | 24 | 21.5 | 3.3 | 10.5 | 1.4 | 2.5 | 7.0 | 60 | 95 | ◯ | 100 | X |
| Comparative Example 11 | Three-layer | 10 | 140 | 0.15 | 0.52 | 2.90 | 56 | 200 × 210 | 205 × 215 | 24 | 21.5 | 3.3 | 10.5 | 1.4 | 2.5 | 7.0 | 60 | 94.5 | ◯ | 100 | X |
| Example 1 | Three-layer | 11 | 155 | 0.15 | 0.52 | 2.91 | 62 | 200 × 210 | 205 × 215 | 24 | 21.5 | 3.3 | 10.5 | 1.4 | 2.5 | 7.0 | 60 | 95 | ◯ | 10 | ◯ |
| Example 2 | Three-layer | 12 | 155 | 0.15 | 0.52 | 2.79 | 64 | 200 × 210 | 205 × 215 | 24 | 21.5 | 3.3 | 10.5 | 1.4 | 2.5 | 7.0 | 60 | 95.3 | ◯ | 10 | ◯ |
| Example 3 | Three-layer | 14 | 160 | 0.15 | 0.52 | 2.62 | 71 | 200 × 210 | 205 × 215 | 24 | 21.5 | 3.3 | 10.5 | 1.4 | 2.5 | 7.0 | 60 | 95 | ◯ | 10 | ◯ |
| Example 4 | Three-layer | 22 | 140 | 0.18 | 0.65 | 2.40 | 81 | 200 × 210 | 205 × 215 | 24 | 21.5 | 3.3 | 10.5 | 1.4 | 2.5 | 7.0 | 60 | 95.5 | ◯ | 9 | ◯ |
| Example 5 | Three-layer | 22 | 150 | 0.17 | 0.55 | 2.22 | 89 | 200 × 210 | 205 × 215 | 24 | 21.5 | 3.3 | 10.5 | 1.4 | 2.5 | 7.0 | 60 | 95 | ◯ | 9 | ◯ |
| Example 6 | Three-layer | 22 | 165 | 0.16 | 0.54 | 2.24 | 91 | 200 × 210 | 205 × 215 | 24 | 21.5 | 3.3 | 10.5 | 1.4 | 2.5 | 7.0 | 60 | 95 | ◯ | 8 | ◯ |
| Example 7 | Three-layer | 22 | 200 | 0.13 | 0.52 | 2.18 | 92 | 200 × 210 | 205 × 215 | 24 | 21.5 | 3.3 | 10.5 | 1.4 | 2.5 | 7.0 | 60 | 94.2 | ◯ | 8 | ◯ |
| Example 8 | Three-layer | 22 | 220 | 0.11 | 0.48 | 2.02 | 93 | 200 × 210 | 205 × 215 | 24 | 21.5 | 3.3 | 10.5 | 1.4 | 2.5 | 7.0 | 60 | 94 | ◯ | 8 | ◯ |
| Example 9 | Three-layer | 22 | 155 | 0.17 | 0.55 | 2.12 | 96 | 200 × 210 | 205 × 215 | 24 | 21.5 | 3.3 | 10.5 | 1.4 | 2.5 | 7.0 | 60 | 95 | ◯ | 9 | ◯ |
| Example 10 | Three-layer | 22 | 180 | 0.16 | 0.53 | 2.31 | 96 | 200 × 210 | 205 × 215 | 24 | 21.5 | 3.3 | 10.5 | 1.4 | 2.5 | 7.0 | 60 | 94 | ◯ | 8 | ◯ |
| Example 11 | Three-layer | 22 | 200 | 0.15 | 0.52 | 2.34 | 99 | 200 × 210 | 205 × 215 | 24 | 21.5 | 3.3 | 10.5 | 1.4 | 2.5 | 7.0 | 60 | 94 | ◯ | 8 | ◯ |
| Example 12 | Three-layer | 22 | 250 | 0.13 | 0.47 | 2.32 | 108 | 200 × 210 | 205 × 215 | 24 | 21.5 | 3.3 | 10.5 | 1.4 | 2.5 | 7.0 | 60 | 94 | ◯ | 7 | ◯ |
| Example 13 | Three-layer | 22 | 305 | 0.1 | 0.43 | 2.15 | 110 | 200 × 210 | 205 × 215 | 24 | 21.5 | 3.3 | 10.5 | 1.4 | 2.5 | 7.0 | 60 | 92.3 | ◯ | 7 | ◯ |
| Example 14 | Three-layer | 11 | 155 | 0.15 | 0.52 | 2.91 | 62 | 200 × 210 | 205 × 215 | 24 | 18 | 3.2 | 8.8 | 1.4 | 2.08 | 8.0 | 50 | 96 | ◯ | 9 | ◯ |
| Example 15 | Three-layer | 22 | 200 | 0.13 | 0.52 | 2.18 | 92 | 200 × 210 | 205 × 215 | 24 | 18 | 3.2 | 8.8 | 1.4 | 2.08 | 8.0 | 50 | 95 | ◯ | 7 | ◯ |
| Example 16 | Three-layer | 22 | 305 | 0.1 | 0.43 | 2.15 | 110 | 200 × 210 | 205 × 215 | 24 | 18 | 3.2 | 8.8 | 1.4 | 2.08 | 8.0 | 50 | 93 | ◯ | 6 | ◯ |

TABLE 1-continued

| | Configuration of resin film | Thickness (μm) | Air permeability (sec/100 ml) | Average pore diameter (μm) | Porosity | Tortuosity factor | R | Size of positive electrode (mm) | Size of negative electrode (mm) | Number of layers | Weight per unit area of positive electrode (mg/cm²) | Density of positive electrode (g/cm³) | Weight per unit area of negative electrode (mg/cm²) | Density of negative electrode (g/cm³) | Rated capacity/pore volume of positive electrode active material layer (Ah/cc) | Battery area/rated capacity (cm²/Ah) | Rated capacity (Ah) | Cycle durability Capacity retention rate (%) | Cycle durability Evaluation | Internal short-circuit Amount of decrease in voltage (mV) | Internal short-circuit Evaluation |
|---|---|---|---|---|---|---|---|---|---|---|---|---|---|---|---|---|---|---|---|---|---|
| Comparative Example 12 | Three-layer | 22 | 320 | 0.09 | 0.4 | 2.01 | 111 | 200 × 210 | 205 × 215 | 24 | 21.5 | 3.3 | 10.5 | 1.4 | 2.5 | 7.0 | 60 | 87 | X | 7 | ○ |
| Comparative Example 13 | Three-layer | 22 | 250 | 0.17 | 0.55 | 2.86 | 115 | 200 × 210 | 205 × 215 | 24 | 21.5 | 3.3 | 10.5 | 1.4 | 2.5 | 7.0 | 60 | 85 | X | 7 | ○ |
| Comparative Example 14 | Three-layer | 22 | 400 | 0.07 | 0.35 | 1.85 | 117 | 200 × 210 | 205 × 215 | 24 | 21.5 | 3.3 | 10.5 | 1.4 | 2.5 | 7.0 | 60 | 73 | X | 5 | ○ |
| Comparative Example 15 | Three-layer | 22 | 320 | 0.09 | 0.4 | 2.01 | 111 | 200 × 204 | 205 × 209 | 24 | 15 | 2.9 | 7.3 | 1.4 | 1.42 | 10.2 | 40 | 88 | X | 5 | ○ |
| Comparative Example 16 | Three-layer | 22 | 320 | 0.09 | 0.4 | 2.01 | 111 | 200 × 179 | 205 × 184 | 24 | 10.2 | 3.2 | 5.3 | 1.4 | 2.08 | 14.3 | 25 | 94 | ○ | 5 | ○ |
| Comparative Example 17 | Three-layer | 22 | 320 | 0.09 | 0.4 | 2.01 | 111 | 200 × 226 | 205 × 231 | 24 | 11.8 | 2.7 | 5.6 | 1.4 | 1.12 | 12.9 | 35 | 93.5 | ○ | 6 | ○ |
| Comparative Example 18 | Three-layer | 22 | 320 | 0.09 | 0.4 | 2.01 | 111 | 80 × 132 | 85 × 137 | 35 | 26 | 3.2 | 12.7 | 1.4 | 2.08 | 3.3 | 15 | 91 | ○ | 6 | ○ |
| Comparative Example 19 | Three-layer | 22 | 250 | 0.17 | 0.55 | 2.86 | 115 | 200 × 179 | 205 × 184 | 24 | 10.2 | 3.2 | 5.3 | 1.4 | 2.08 | 14.3 | 25 | 93.5 | ○ | 5 | ○ |
| Comparative Example 20 | Three-layer | 22 | 250 | 0.17 | 0.55 | 2.86 | 115 | 200 × 226 | 205 × 231 | 24 | 11.8 | 2.7 | 5.6 | 1.4 | 1.12 | 12.9 | 35 | 93.5 | ○ | 6 | ○ |
| Comparative Example 21 | Three-layer | 22 | 250 | 0.17 | 0.55 | 2.86 | 115 | 80 × 132 | 85 × 137 | 35 | 26 | 3.2 | 12.7 | 1.4 | 2.08 | 3.3 | 15 | 92 | ○ | 7 | ○ |

TABLE 1-continued

| | Configuration of resin film | Thickness (μm) | Air permeability (sec/100 ml) | Average pore diameter (μm) | Porosity | Tortuosity factor | R | Size of positive electrode (mm) | Size of negative electrode (mm) | Number of layers | Weight per unit area of positive electrode (mg/cm²) | Density of positive electrode (g/cm³) | Weight per unit area of negative electrode (mg/cm²) | Density of negative electrode (g/cm³) | Rated capacity/pore volume of positive electrode active material layer (Ah/cc) | Battery area/rated capacity (cm²/Ah) | Rated capacity (Ah) | Cycle durability Capacity retention rate (%) | Cycle durability Evaluation | Internal short-circuit Amount of decrease in voltage (mV) | Internal short-circuit Evaluation |
|---|---|---|---|---|---|---|---|---|---|---|---|---|---|---|---|---|---|---|---|---|---|
| Comparative Example 22 | Three-layer | 22 | 400 | 0.07 | 0.35 | 1.85 | 117 | 200 × 179 | 205 × 184 | 24 | 10.2 | 3.2 | 5.3 | 1.4 | 2.08 | 14.3 | 25 | 91 | ○ | 5 | ○ |
| Comparative Example 23 | Three-layer | 22 | 400 | 0.07 | 0.35 | 1.85 | 117 | 200 × 226 | 205 × 231 | 24 | 11.8 | 2.7 | 5.6 | 1.4 | 1.12 | 12.9 | 35 | 91 | ○ | 5 | ○ |
| Comparative Example 24 | Three-layer | 22 | 400 | 0.07 | 0.35 | 1.85 | 117 | 80 × 132 | 85 × 137 | 35 | 26 | 3.2 | 12.7 | 1.4 | 2.08 | 3.3 | 15 | 90 | ○ | 5 | ○ |
| Comparative Example 25 | Three-layer | 10 | 140 | 0.15 | 0.52 | 2.90 | 56 | 200 × 210 | 205 × 215 | 24 | 18 | 3.2 | 8.8 | 1.4 | 2.08 | 8.0 | 50 | 95 | ○ | 90 | X |
| Comparative Example 26 | Three-layer | 22 | 320 | 0.09 | 0.4 | 2.01 | 111 | 200 × 210 | 205 × 215 | 24 | 18 | 3.2 | 8.8 | 1.4 | 2.08 | 8.0 | 50 | 89 | X | 6 | ○ |

From the results presented in the above Table 1, it is found that, in the non-aqueous electrolyte secondary battery according to the present invention, the discharge capacity retention rate after the 1000th cycle is maintained to be a high value and cycle durability is excellent. Further, in the insulation property evaluation, it is found that the amount of decrease in voltage is kept to be a small value and occurrence of internal short-circuit is sufficiently suppressed.

Particularly, it was found that, in Examples 6 to 13, 15, and 16 in which the value R of the separator is in a range of 91 to 110, the amount of decrease in voltage is maintained to be a further lower value and the battery is particularly excellent in view of safety. Meanwhile, it was found that, in Examples 1 to 3 and 14 in which the value R is in a range of 62 to 80, the capacity retention rate is a further higher value and the battery is particularly excellent in view of cycle durability. Further, it was found that, in Examples 4 and 5 in which the value R of the separator is in a range of 81 to 90, both the effect of improving cycle durability and the effect of suppressing internal short-circuit (the effect of reducing the amount of decrease in voltage) can be achieved at a high level.

On the other hand, it was shown that, in Comparative Examples 7 to 14, 25, and 26 in which the respective parameters of the separator are values out of a predetermined range and the resin film has a single-layer structure in the battery having a capacity and a size which are assumed to increase the capacity, cycle durability or suppression of internal short-circuit is not sufficient. In particular, in Comparative Examples 9 to 11 and 25 in which the value R is less than 62, although cycle durability is sufficient, since the amount of decrease in voltage in the insulation property evaluation was not sufficient, internal short-circuit occurred and a problem of safety arose. On the other hand, in Comparative Examples 12 to 14 and 26 in which R is more than 110, although internal short-circuit can be sufficiently suppressed, the capacity retention rate was less than 90%, and as a result, desired cycle durability was not obtainable.

Incidentally, Comparative Examples 1 to 6 and 15 to 24 are a battery in which any of the ratio of the rated capacity to the pore volume of the positive electrode active material layer, the ratio of the battery area to the rated capacity, or the rated capacity is out of the range assumed in the present invention (that is, a battery not having a capacity and a size which are assumed to increase the capacity). In this case, even when the respective parameters of the separator are values out of a predetermined range or the resin film has a single-layer structure, high cycle durability and a sufficient effect of suppressing internal short-circuit were obtainable. This means that the significant effect obtained by using the separator in which the resin film has a three-layer structure and each parameter is a value in a predetermined range is not shown in a small-sized battery or a low-capacity and low-density battery. Also from this point of view, the present invention can be said to be a problem solving means dedicated to a non-aqueous electrolyte secondary battery having a high capacity, a high density, a large area, and a high capacity.

REFERENCE SIGNS LIST 10, 50 Lithium ion secondary battery
11 Negative electrode current collector
12 Positive electrode current collector
13 Negative electrode active material layer
15 Positive electrode active material layer
17 Separator
19 Single battery layer
21, 57 Power generating element
25 Negative electrode current collecting plate
27 Positive electrode current collecting plate
29, 52 Battery outer casing body
58 Positive electrode tab
59 Negative electrode tab

The invention claimed is:

1. A non-aqueous electrolyte secondary battery comprising a power generating element including
   a positive electrode obtained by forming a positive electrode active material layer containing a positive electrode active material on a surface of a positive electrode current collector,
   a negative electrode obtained by forming a negative electrode active material layer containing a negative electrode active material on a surface of a negative electrode current collector, and
   a separator including a resin film having a three-layer structure,
   a ratio of a rated capacity to a pore volume of the positive electrode active material layer being 2.08 Ah/cc or more, a ratio of a battery area to a rated capacity being 7 cm$^2$/Ah or more, and a rated capacity being 50 Ah or more, wherein
   a value R of the separator represented by the following Formula 1 is 62 to 110:

$$R = \frac{\text{Tortuosity factor} \times \text{Thickness [}\mu\text{m]}}{\text{Porosity}} \quad \text{(Formula 1)}$$

provided that, in Formula 1, a tortuosity factor is a value represented by the following Formula 2:

$$\text{Tortuosity factor} = \sqrt{\frac{\text{Air permeability [sec/100 ml]} \times \text{Average pore diameter [}\mu\text{m]} \times \text{Porosity}}{\text{Thickness [}\mu\text{m]} \times 25 \times 5.18 \times 10^{-3}}} \quad \text{(Formula 2)}$$

the average pore diameter is 0.10 to 0.18 µm,
the porosity is 0.43 to 0.65,
the air permeability is 140 to 305 sec/100 ml, and
the thickness is 11 to 25 µm.

2. The non-aqueous electrolyte secondary battery according to claim 1, wherein the R is 91 to 110.

3. The non-aqueous electrolyte secondary battery according to claim 1, wherein the R is 81 to 90.

4. The non-aqueous electrolyte secondary battery according to claim 1, wherein the R is 62 to 80.

5. The non-aqueous electrolyte secondary battery according to claim 1, wherein the separator has a laminate structure of the resin film and a heat resistant insulating layer.

6. The non-aqueous electrolyte secondary battery according to claim 1, wherein a constituent of the resin film is at least one of polypropylene and polyethylene.

7. The non-aqueous electrolyte secondary battery according to claim 1, wherein the non-aqueous electrolyte secondary battery is a flat stack type laminate battery obtained by sealing the power generating element in a battery outer casing body formed of a laminate film containing aluminum.

* * * * *